US008495417B2

(12) United States Patent
Jernigan, IV et al.

(10) Patent No.: US 8,495,417 B2
(45) Date of Patent: Jul. 23, 2013

(54) SYSTEM AND METHOD FOR REDUNDANCY-PROTECTED AGGREGATES

(75) Inventors: Richard P. Jernigan, IV, Sewickley, PA (US); Robert Wyckoff Hyer, Jr., Mars, PA (US); Michael L. Kazar, Pittsburgh, PA (US); Daniel S. Nydick, Wexford, PA (US)

(73) Assignee: NetApp, Inc., Sunnyvale, CA (US)

( * ) Notice: Subject to any disclaimer, the term of this patent is extended or adjusted under 35 U.S.C. 154(b) by 355 days.

(21) Appl. No.: 12/351,476

(22) Filed: Jan. 9, 2009

(65) Prior Publication Data
US 2010/0180153 A1 Jul. 15, 2010

(51) Int. Cl.
*G06F 11/00* (2006.01)

(52) U.S. Cl.
USPC .......................... 714/6.24; 711/114

(58) Field of Classification Search
USPC ............... 714/5, 6, 750, 770, 47, 4, 6.2, 6.22, 714/6.24, 6.1, 4.1; 711/114
See application file for complete search history.

(56) References Cited

U.S. PATENT DOCUMENTS

| | | | |
|---|---|---|---|
| 3,876,978 A | 4/1975 | Bossen et al. | |
| 4,092,732 A | 5/1978 | Ouchi | |
| 4,201,976 A | 5/1980 | Patel | |
| 4,205,324 A | 5/1980 | Patel | |
| 4,375,100 A | 2/1983 | Tsuji et al. | |
| 4,467,421 A | 8/1984 | White | |
| 4,517,663 A | 5/1985 | Imazeki et al. | |
| 4,547,882 A | 10/1985 | Tanner | |
| 4,667,326 A | 5/1987 | Young et al. | |
| 4,688,221 A | 8/1987 | Nakamura et al. | |
| 4,722,085 A | 1/1988 | Flora et al. | |
| 4,755,978 A | 7/1988 | Takizawa et al. | |
| 4,761,785 A | 8/1988 | Clark et al. | |
| 4,775,978 A | 10/1988 | Hartness | |
| 4,796,260 A | 1/1989 | Schilling et al. | |

(Continued)

FOREIGN PATENT DOCUMENTS

| EP | 0 521 630 | 1/1993 |
|---|---|---|
| EP | 1 324 200 A2 | 7/2003 |

(Continued)

OTHER PUBLICATIONS

Bultman, David L., High Performance SCSI Using Parallel Drive Technology, In Proc. BUSCON Conf., pp. 40-44, Anaheim, CA, Feb. 1988.

(Continued)

*Primary Examiner* — Scott Baderman
*Assistant Examiner* — Joseph Kudirka
(74) *Attorney, Agent, or Firm* — Cesari and McKenna, LLP

(57) ABSTRACT

The present invention provides a system and a method for utilizing a parity protection module to back up data on striped aggregates. Specifically, the system computes parity data for data stored at a particular location of each of a plurality of constituent aggregates, and stores the parity on one of the constituent aggregates that is a parity owner for that particular location of data. In the event one of the constituent aggregates fails, new data may still be accessed by the system (the striped aggregates), both to write new data, and to read data stored on the failed aggregate. In particular, the parity protection module allows clients to read data from a failed aggregate by running a reverse parity computation, which may also be used to restore the data to the failed aggregate.

20 Claims, 16 Drawing Sheets

U.S. PATENT DOCUMENTS

| | | | |
|---|---|---|---|
| 4,817,035 A | 3/1989 | Timsit | |
| 4,825,403 A | 4/1989 | Gershenson et al. | |
| 4,837,680 A | 6/1989 | Crockett et al. | |
| 4,847,842 A | 7/1989 | Schilling | |
| 4,849,929 A | 7/1989 | Timsit | |
| 4,849,974 A | 7/1989 | Schilling et al. | |
| 4,849,976 A | 7/1989 | Schilling et al. | |
| 4,870,643 A | 9/1989 | Bultman et al. | |
| 4,899,342 A | 2/1990 | Potter et al. | |
| 4,989,205 A | 1/1991 | Dunphy, Jr. et al. | |
| 4,989,206 A | 1/1991 | Dunphy, Jr. et al. | |
| 5,077,736 A | 12/1991 | Dunphy, Jr. et al. | |
| 5,088,081 A | 2/1992 | Farr | |
| 5,101,492 A | 3/1992 | Schultz et al. | |
| 5,128,810 A | 7/1992 | Halford | |
| 5,148,432 A | 9/1992 | Gordon et al. | |
| RE34,100 E | 10/1992 | Hartness | |
| 5,163,131 A | 11/1992 | Row et al. | |
| 5,166,936 A | 11/1992 | Ewert et al. | |
| 5,179,704 A | 1/1993 | Jibbe et al. | |
| 5,202,979 A | 4/1993 | Hillis et al. | |
| 5,208,813 A | 5/1993 | Stallmo | |
| 5,210,860 A | 5/1993 | Pfeffer et al. | |
| 5,218,689 A | 6/1993 | Hotle | |
| 5,233,618 A | 8/1993 | Glider et al. | |
| 5,235,601 A | 8/1993 | Stallmo et al. | |
| 5,237,658 A | 8/1993 | Walker et al. | |
| 5,257,367 A | 10/1993 | Goodlander et al. | |
| 5,271,012 A | 12/1993 | Blaum et al. | |
| 5,274,799 A | 12/1993 | Brant et al. | |
| 5,305,326 A | 4/1994 | Solomon et al. | |
| 5,351,246 A | 9/1994 | Blaum et al. | |
| 5,375,128 A | 12/1994 | Menon et al. | |
| 5,410,667 A | 4/1995 | Belsan et al. | |
| 5,537,567 A | 7/1996 | Galbraith et al. | |
| 5,579,475 A | 11/1996 | Blaum et al. | |
| 5,623,595 A | 4/1997 | Bailey | |
| 5,657,468 A | 8/1997 | Stallmo et al. | |
| 5,805,788 A | 9/1998 | Johnson | |
| 5,812,753 A | 9/1998 | Chiariotti | |
| 5,819,292 A | 10/1998 | Hitz et al. | |
| 5,862,158 A | 1/1999 | Baylor et al. | |
| 5,864,655 A * | 1/1999 | Dewey et al. | 714/6.32 |
| 5,884,098 A | 3/1999 | Mason, Jr. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,092,215 A | 7/2000 | Hodges et al. | |
| 6,138,125 A | 10/2000 | DeMoss | |
| 6,138,126 A | 10/2000 | Hitz et al. | |
| 6,138,201 A | 10/2000 | Rebaski | |
| 6,158,017 A | 12/2000 | Han et al. | |
| 6,223,300 B1 | 4/2001 | Gotoh | |
| 6,247,157 B1 | 6/2001 | Edirisooriya | |
| 6,289,356 B1 | 9/2001 | Hitz et al. | |
| 6,408,400 B2 * | 6/2002 | Taketa et al. | 714/5 |
| 6,532,548 B1 | 3/2003 | Hughes | |
| 6,546,499 B1 * | 4/2003 | Challener et al. | 714/6.12 |
| 6,557,123 B1 | 4/2003 | Wiencko et al. | |
| 6,571,326 B2 | 5/2003 | Spiegel et al. | |
| 6,581,185 B1 | 6/2003 | Hughes | |
| 6,671,772 B1 | 12/2003 | Cousins | |
| 6,671,773 B2 | 12/2003 | Kazar et al. | |
| 6,742,137 B1 | 5/2004 | Frey, Jr. | |
| 6,779,095 B2 | 8/2004 | Selkirk et al. | |
| 6,826,711 B2 * | 11/2004 | Moulton et al. | 714/6 |
| 6,993,701 B2 | 1/2006 | Corbett et al. | |
| 7,073,115 B2 | 7/2006 | English et al. | |
| 7,133,967 B2 * | 11/2006 | Fujie et al. | 711/114 |
| 7,188,270 B1 * | 3/2007 | Nanda et al. | 714/6.21 |
| 7,200,715 B2 * | 4/2007 | Kleiman et al. | 711/114 |
| 7,203,892 B2 | 4/2007 | Corbett et al. | |
| 7,246,301 B2 * | 7/2007 | Chawla | 714/764 |
| 7,328,305 B2 | 2/2008 | Kleiman et al. | |
| 7,409,494 B2 | 8/2008 | Edwards et al. | |
| 7,409,625 B2 | 8/2008 | Corbett et al. | |
| 7,454,445 B2 | 11/2008 | Lewis et al. | |
| 7,617,370 B2 | 11/2009 | Jernigan et al. | |
| 2002/0116593 A1 | 8/2002 | Kazar et al. | |
| 2002/0124137 A1 | 9/2002 | Ulrich et al. | |
| 2005/0166016 A1 * | 7/2005 | Morimoto | 711/114 |
| 2005/0246401 A1 | 11/2005 | Edwards et al. | |
| 2006/0200697 A1 * | 9/2006 | Ito | 714/6 |
| 2006/0248273 A1 | 11/2006 | Jernigan et al. | |
| 2007/0011579 A1 * | 1/2007 | Suzuki et al. | 714/763 |
| 2008/0201524 A1 * | 8/2008 | Petrescu et al. | 711/114 |

FOREIGN PATENT DOCUMENTS

| | | |
|---|---|---|
| EP | 1 796 001 | 6/2007 |
| WO | WO-01/13236 A1 | 2/2001 |
| WO | WO-02/29539 A2 | 4/2002 |

OTHER PUBLICATIONS

Evans The Tip of the Iceberg:RAMAC Virtual Array—Part I, Technical Support, Mar. 1997, pp. 1-4.

Gibson, Garth A., et al., Coding Techniques for Handling Failures in Large Disk Arrays, Technical Report UCB/CSD 88/477, Computer Science Division, University of California, Jul. 1988.

Gibson, Garth A., et al., Failure Correction Techniques for Large Disk Arrays, In Proceedings Architectural Support for Programming Languages and Operating Systems, Boston, Apr. 1989, pp. 123-132.

Gibson, Garth A., et al., Strategic Directions in Storage I/O Issues in Large-Scale Computing, ACM Computing Survey, 28(4):779-93, Dec. 1996.

Hitz, David, TR3002 File System Design for a NFS File Server Appliance, Network Appliance, Inc.

Menon, Jai, et al., Methods for Improved Update Performance of Disk Arrays, IBM Almaden Research Center, IEEE, Jan. 1992, 10 pages.

Menon, Jai, et al., Floating Parity and Data Disk Arrays, Journal of Parallel and Distributed Computing, Boston: Academic Press. Inc., vol. 17 No. 1 and 2, Jan./Feb. 1993, 13 pages.

Park, Arvin, et al., Providing Fault Tolerance in Parallel Secondary Storage Systems, Technical Report CS-TR-057-86, Princeton, Nov. 1986.

Patel, Arvind M., Adaptive Cross-Parity (AXP) Code for a High-Density Magnetic Tape Subsystem, IBM Technical Disclosure Bulletin 29(6):546-562, Nov. 1985.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987).

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 (Sep. 1988).

Patterson, David A., et al., Introduction to Redundant Arrays of Inexpensive Disks (RAID). In IEEE Spring 89 COMPCON, San Francisco, IEEE Computer Society Press, Feb. 27-Mar. 3, 1989, pp. 112-117.

Schulze, Martin E., Considerations in the Design of a RAID Prototype, Computer Science Division, Department of Electrical Engineering and Computer Sciences, Univ. of CA, Berkley, Aug. 25, 1988.

Schulze, Martin., et al., How Reliable is a RAID?, Proceedings of COMPCON, 1989, pp. 118-123.

Stonebraker, Michael, et al., The Design of XPRS, Proceedings of the 14th VLDB Conference, LA, CA (1988).

NetApp, Inc., Notification of Transmittal of the International Search Report and the Written Opinion of the International Searching Authority, or the Declaration, International Application No. PCT/US2010/000029, Filed Jan. 1, 2010, European Patent Office, NL, mailed Mar. 29, 2010, 15 pages.

* cited by examiner

SYSTEM AND METHOD FOR REDUNDANCY-PROTECTED AGGREGATES

FIELD OF THE INVENTION

The present invention is directed to storage systems, and, in particular, to redundancy-protected aggregates on one or more storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices may be persistent electronic storage devices, such as flash memories, but are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is illustratively implemented on one or more storage volumes of physical disks, defining an overall logical arrangement of storage space. The storage operating system of the storage system may implement a high-level module, such as a file system, to logically organize the information stored on the volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems or nodes may be interconnected to provide a storage system cluster configured to service many clients. Each storage system may be configured to service one or more aggregates, wherein each aggregate contains one or more volumes of disks. Aggregates are further described in commonly owned, U.S. Patent Publication No. 2005/0246401, entitled EXTENSION OF WRITE ANYWHERE FILE SYSTEM LAYOUT, by John K. Edwards et al., now issued as U.S. Pat. No. 7,409,494 on Aug. 5, 2008, the contents of which are hereby incorporated by reference. Aggregates can fail for a number of reasons, including lost connectivity, failure of a significant number of disks within a volume and/or aggregate, etc. When an aggregate fails, clients may be unable to access the data contained on the failed aggregate.

Typically, the disks of a volume/aggregate are organized into Redundant Arrays of Independent (or Inexpensive) Disk (RAID) groups. Most RAID implementations enhance the reliability/integrity of the data storage through the redundant writing of data "stripes" across a given number of physical disks in the RAID group and by storing redundancy information (e.g., parity) with respect to the striped data. The use of a RAID group thus protects data locally stored in the group of the aggregate. That is, RAID groups generally provide protection against the loss of data on one or more disks within the group of an aggregate, which is served by a particular storage system. If the storage system itself fails, however, then the data stored on the served aggregate is no longer accessible to the client, thus resulting in aggregate failure.

One solution to such aggregate failure has been to create a mirrored image ("mirror") of the data contained on the aggregate and service that mirror on another storage system. Mirroring of an aggregate typically requires complete duplication of storage system resources, including storage devices, resulting in an inefficient use of storage space (for example by utilizing half of the overall space consumed on a storage system) and substantial operating costs. Additionally, the response time in some mirrored systems, e.g., a mirrored synchronous storage system, may be especially slow because such systems store data in both mirrors before the systems can respond to clients that the data has been persistently stored.

SUMMARY OF THE INVENTION

The present invention overcomes the disadvantages of the prior art by providing a storage architecture that implements redundancy-protected aggregates across a plurality of nodes interconnected as a cluster. Each node is embodied as a storage system that is primarily responsible for servicing a locally attached aggregate. Moreover, each storage system is associated with a designated "partner" storage system in the cluster that is configured to service the aggregate in the event of a failure. That is, redundancy-protected aggregates are configured so that if a storage system (e.g., its attached aggregate) fails, the storage system (or its partner) can reconstruct the data which would be otherwise in-accessible from the failed aggregate.

To that end, a plurality of aggregates of the cluster is illustratively organized as "striped aggregates." The striped aggregates illustratively comprise a plurality of constituent aggregates where each constituent aggregate comprises a plurality of disks, e.g., organized into one or more RAID groups. Specifically, when data is written to the disks on a particular aggregate, the data is written to (e.g., striped across) each of the disks of that aggregate. The written data is then compared with data of the remaining constituent aggregates to compute corresponding redundancy information, e.g., parity, which is stored on one of the aggregates at a corresponding location (a "parity owner" aggregate). For instance, a logical, e.g., an exclusive OR, (XOR) value may be computed to determine whether the related parity should be changed on the particular parity owner.

Illustratively, a block range of the storage space of each aggregate is divided into arbitrary fixed-size "parity regions" wherein within each region only one constituent aggregate is assigned as the parity owner. Ownership of a parity region, however, may be distributed evenly across the cluster so that no constituent aggregate is designated to serve as the parity owner of a region more often than any other constituent aggregate. Therefore, for any given block in a plurality of N aggregates, N-1 of the aggregates is a group of data/consumer aggregates, and an Nth aggregate is a parity owner aggregate at a particular offset within the block storage space. The consumer aggregates store their own data at an offset of the storage space while the parity owner aggregates store parity of the consumer aggregates at that same offset. For example, in order to maintain and store the parity protected data, each constituent aggregate may illustratively reserve 1/Nth of its own storage space capacity for storing the parity of data corresponding to the other constituent aggregates, wherein N is the number of aggregates in the striped aggregates.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

According to one or more embodiments described herein, redundancy-protected aggregates are configured so that if one aggregate of a clustered storage system fails, the storage system (or its partner) can reconstruct the data stored on the failed aggregate, which would be otherwise inaccessible by the other storage systems of the cluster. For instance, striped aggregates illustratively comprise a plurality of constituent aggregates. Redundancy information, e.g., parity, is distributed among the constituent aggregates based upon the number of constituent aggregates in the cluster and arbitrary fixed-size "parity regions," wherein within each region only one constituent aggregate is assigned as a parity owner. During a "normal" mode of operation, data is written to an aggregate and parity computed for the data is written to a corresponding parity owner, e.g., based on the parity region of the written data and the constituent aggregates of the striped aggregates. Upon failure of an aggregate, a "degraded" mode is entered where the storage system utilizes the parity of the distributed parity regions to determine and serve the data of the failed aggregate. Once the failed aggregate is restored or replaced, a "rebuild" mode may provide any updates (or the entire data set) to the restored aggregate.

A. Cluster Environment

Figure 1:
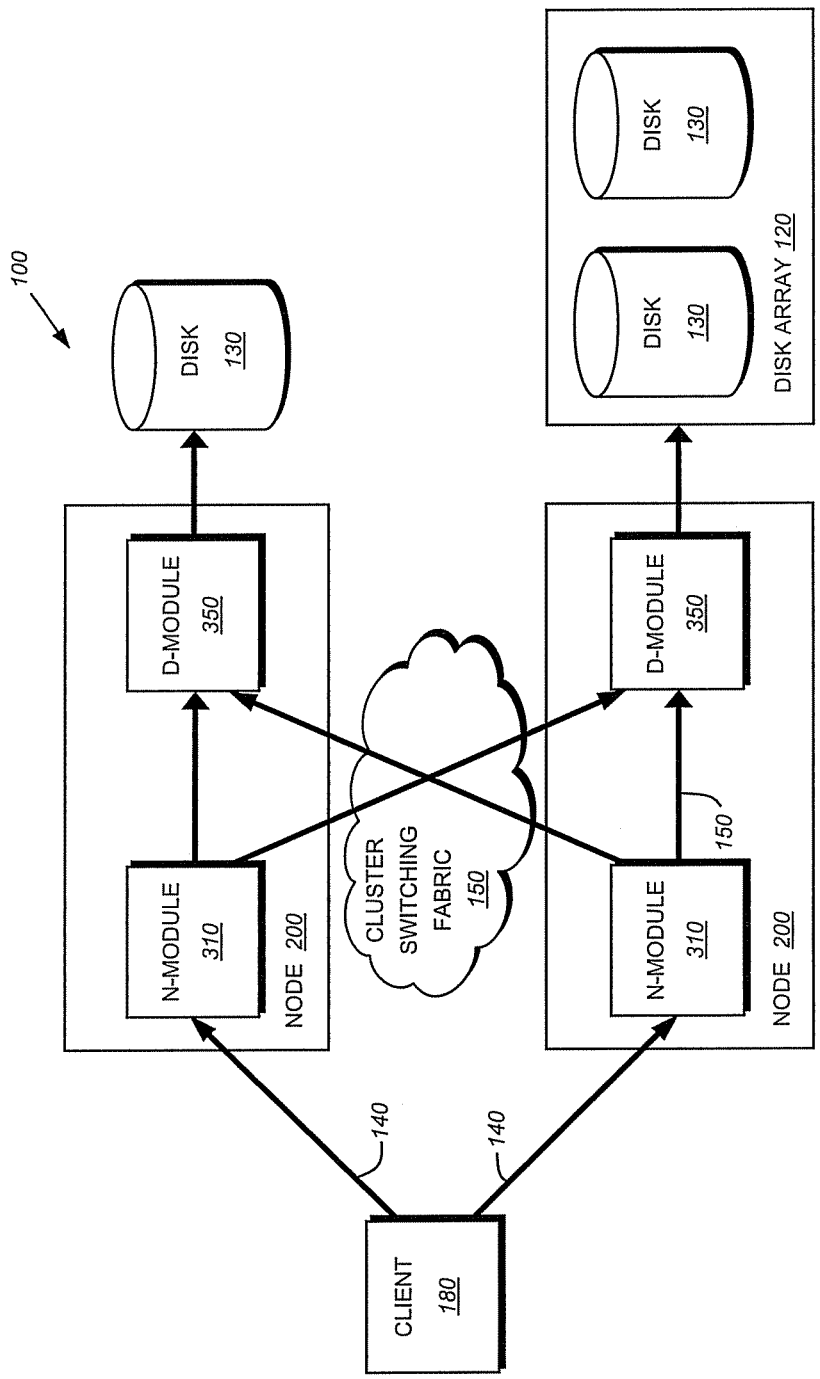
FIG. 1 is a schematic block diagram of a plurality of nodes interconnected as a cluster in accordance with an illustrative embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002, now issued as U.S. Pat. No. 6,671,773 on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
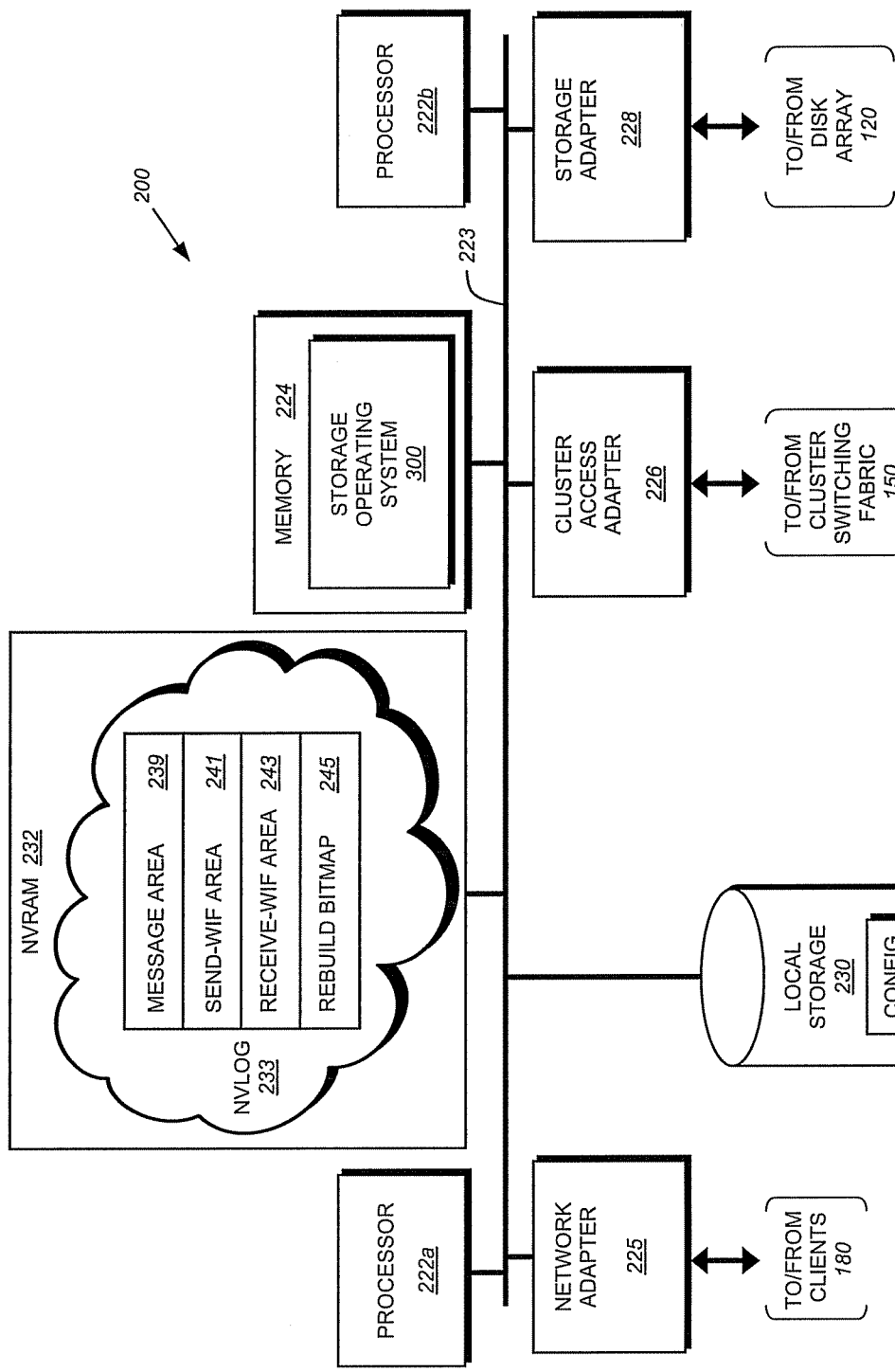
FIG. 2 is a schematic block diagram of a node in accordance with an illustrative embodiment of the present invention.

FIG. 2 is a schematic block diagram of a node 200 that is illustratively embodied as a storage system comprising a plurality of processors 222a-b, a memory 224, a network adapter 225, a cluster access adapter 226, a storage adapter 228, a persistent, electronic storage device, such as a Non-Volatile Random Access Memory (NVRAM) 232 and local storage 230 interconnected by a system bus 223. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processors and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (e.g., Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory (e.g., flash memory), micro-electro mechanical and any other similar media adapted to store information, including data and redundancy (e.g., parity) information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each volume is generally, although not necessarily, associated with its own file system. The disks within a volume may be further organized as an aggregate comprising one or more groups of disks, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data.

Parity protection is used in the storage system to protect against loss of data on a storage device, such as a disk. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction are on 1-bit vectors equivalent to an exclusive-OR (XOR) logical operation and accordingly, the addition and subtraction operations are replaced by XOR operations. The data is then protected against the loss of any of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. The disk storage space is divided into stripes, with each stripe containing one block from each disk. The blocks of a stripe are usually at the same locations on each disk in the group. Within a stripe, all but one of the blocks contain data ("data blocks") and one of the blocks contains parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is referred to as RAID-5. While illustrative examples of RAID implementations are a RAID-4 or RAID-5 level implementation, it should be understood that other types and levels of RAID implementations may be used in accordance with the inventive principles described herein.

The NVRAM 232 may be embodied as a solid state random access memory array having either a back-up battery, or other built-in last-state-retention capabilities (e.g., flash memory), that holds the last state of the memory in the event of any power loss to the array. A portion of the NVRAM 232 is organized as a Non-Volatile Log (NVLOG 233) configured to provide a temporary, yet persistent, storage space capable of maintaining write requests, including write data (updates), directed to data containers served by the node (storage system), particularly in light of a failure to the system. To that end, the NVLOG 233 stores write data prior to the data being stored on disk, thereby improving responsiveness to client requests.

Illustratively, the NVRAM 232 (e.g., the NVLOG 233) may be organized into a plurality of areas, including, e.g., a message area 239, a "Send-WIF" area 241, a "Receive-WIF" area 243 and one or more Rebuild Bitmaps 245, each as described herein. In particular, the message area 239 is utilized to store write data received from client operations directed to a data container that is being serviced by the storage system. The Send-WIF area 241 is utilized to provide atomicity between writing a block locally (e.g., to a locally-attached aggregate of the storage system) and sending a parity update request to a remote node, as described further below by storing a record of the transactions. Once the block has been written to a local disk of the aggregate and the parity has been updated, the records are removed from the Send WIF area. In alternative embodiments, the Send-WIF area 241 may be mirrored to a failover partner. The NVLOG 233 also implements the Receive-WIF area 243 to ensure that there is only one set of semantics written to parity. For example, when a record and an associated transaction identifier (ID) are written to this area in accordance with a first request, the NVLOG 233 will detect a second duplicate request that attempts to perform the same parity write, and thus delete the second request. In accordance with an illustrative embodiment of the present invention, the Receive-WIF area may mirror its records with a failover partner. Finally, at least one Rebuild Bitmap area 245 is allocated in the NVLOG 233 for each aggregate. Initially these bitmap areas are clear (empty), and are only populated when the cluster is in degraded mode to indicate which regions of an aggregate have been dirtied and is rebuilt during recovery.

C. Storage Operating System

To facilitate access to the disks 130, the storage operating system 300 may illustratively implement a write-anywhere file system that cooperates with one or more virtualization modules to "virtualize" the storage space provided by disks 130. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers, such as blocks on the disks that are exported as named logical unit numbers (luns).

In the illustrative embodiment, the storage operating system is preferably the NetApp® Data ONTAP® operating system available from NetApp, Inc., of Sunnyvale, Calif. that implements a Write Anywhere File Layout (WAFL®) file system. However, it is expressly contemplated that any appropriate storage operating system may be enhanced for use in accordance with the inventive principles described herein. As such, where the term Data ONTAP® is employed, it should be taken broadly to refer to any storage operating system that is otherwise adaptable to the teachings of this invention.

Figure 3:
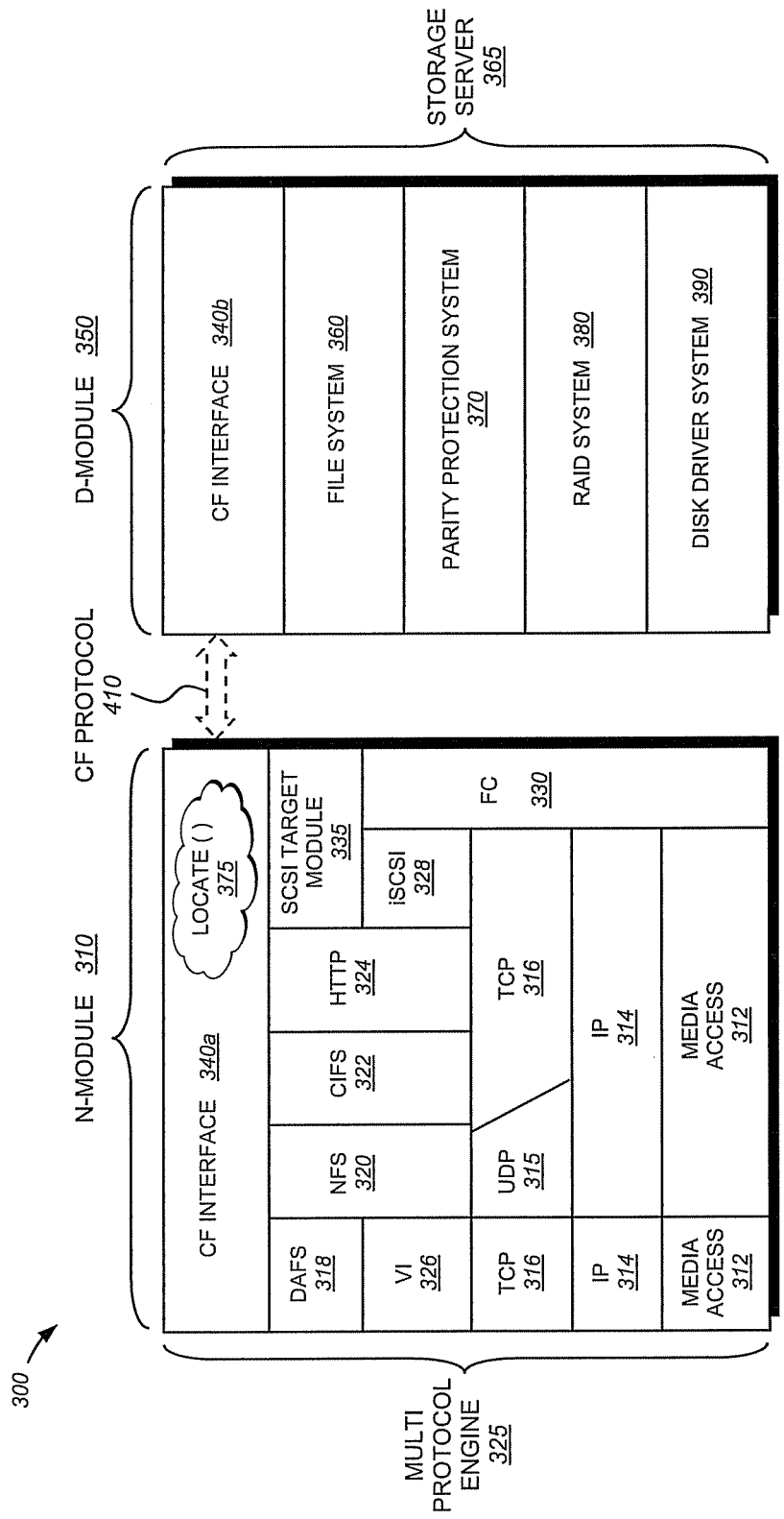
FIG. 3 is a schematic block diagram of a storage operating system that may be advantageously used with an illustrative embodiment of the present invention.

FIG. 3 is a schematic block diagram of a storage operating system 300 that may be advantageously used in accordance with an illustrative embodiment of the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the storage system/node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a parity protection module 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The parity protection module 370 implements striped aggregates in accordance with an illustrative embodiment of the present invention as described herein. It should be noted that while the parity protection module 370 is shown interposed between the file system 360 and the RAID system 380, the functionality of the parity protection module 370 may be alternatively integrated into other modules e.g., the RAID system and/or the file system 360. As such, the description of a separate parity protection module 370 should be taken as illustrative only.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework, in response to a user (system administrator) issuing commands to the node 200. The SCSI target module 335 is generally disposed between the FC and iSCSI drivers 330, 328 respectively and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here (e.g., for a read request), the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk, dbn) and sent to an appropriate driver (e.g., SCSI) of the disk driver system 390. The disk driver accesses the dbn from the specified disk 140 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225 and/or 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a, b adapted to implement intra-cluster communication among the modules, including D-module-to-D-module communication for data container striping operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and CF protocols available from NetApp, Inc. The SpinFS protocol is described in the above-referenced METHOD AND SYSTEM FOR RESPONDING TO FILE SYSTEM REQUEST, U.S. Patent Publication No. US 2002/0116593, by Michael Kazar et al., now issued as U.S. Pat. No. 6,671,773 on Dec. 30, 2003, the contents of which are hereby incorporated by reference.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310, encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 decapsulates the CF message and processes the file system command.

Figure 4:
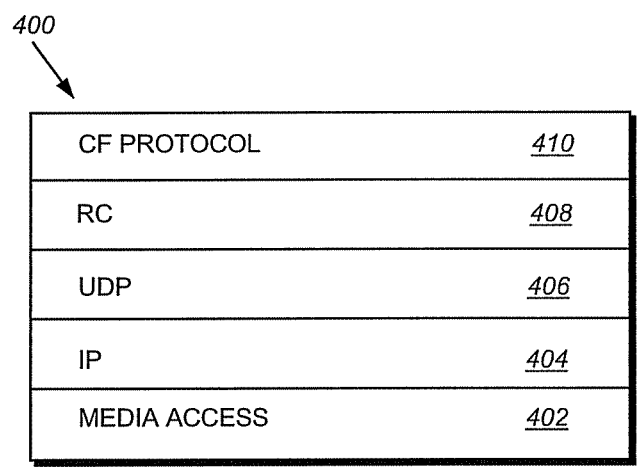
FIG. 4 is a schematic block diagram illustrating the format of a cluster fabric (CF) message in accordance with an illustrative embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406. In accordance with an illustrative embodiment of the present invention, the CF protocol is embodied to distribute parity associated with data stored on the disks of an aggregate served by a node of a cluster to another node (storage system) hosting that parity for a given region of parity, as described further below.

E. File System Organization

Figure 5:
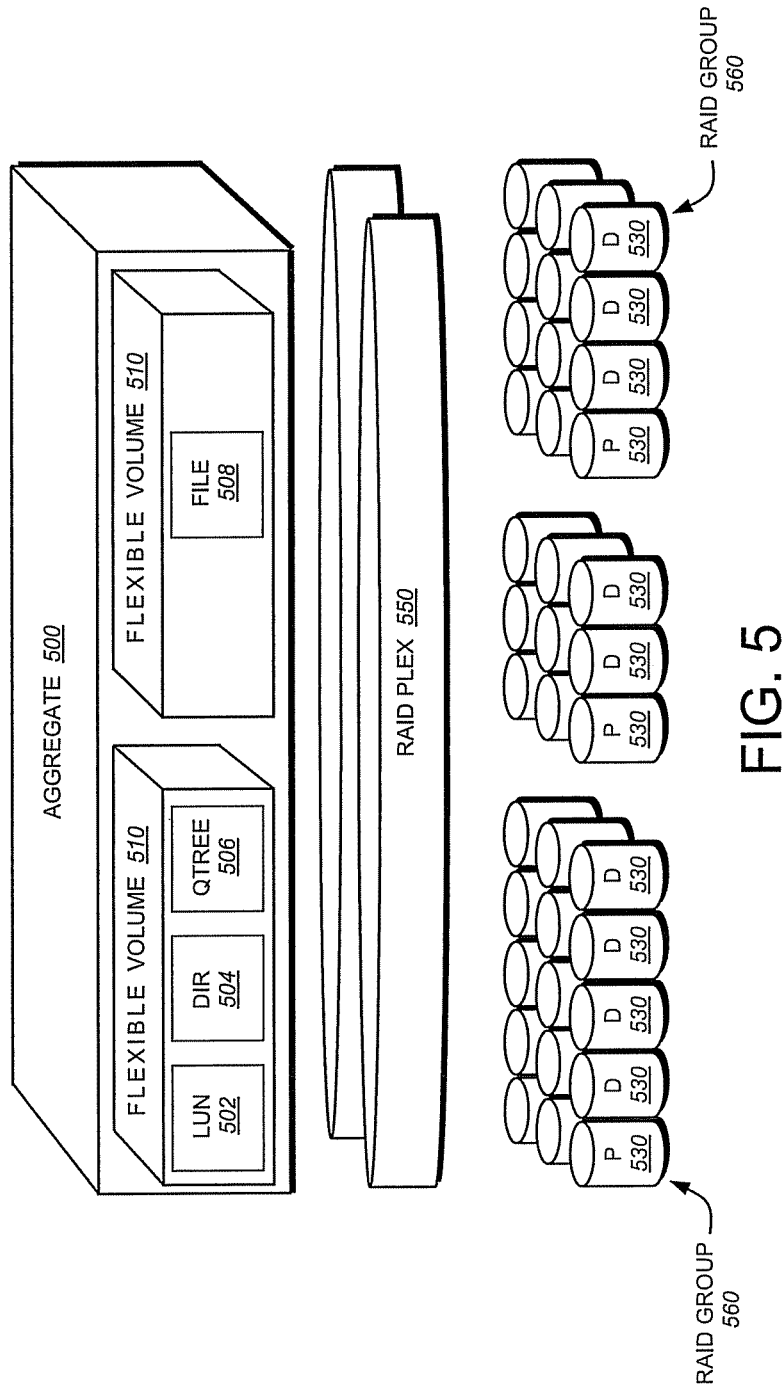
FIG. 5 is a schematic block diagram of an aggregate in accordance with an illustrative embodiment of the present invention.

FIG. 5 is a schematic block diagram of an embodiment of an aggregate 500 that may be advantageously used with the present invention. In an illustrative embodiment, the aggregate 500 is a physical volume comprising one or more groups of disks, such as RAID groups, of the storage system. The aggregate has its own physical vbn (PVBN) storage space and maintains metadata, such as block allocation structures, within that PVBN space. Moreover, the aggregate 500 may be apportioned into one or more virtual volumes. Each virtual volume has its own virtual volume block number (VVBN) storage space and maintains metadata, such as block allocation structures, within that VVBN space. Luns (blocks) 502, directories 504, qtrees 506 and files 508 may be contained within the virtual volumes, such as flexible volumes 510, that, in turn, are contained within the aggregate 500. The aggregate 500 is illustratively layered on top of the RAID system, which is represented by at least one RAID plex 550 (depending upon whether the storage configuration is mirrored), wherein each plex 550 comprises at least one RAID group 560. Each RAID group further comprises a plurality of disks 530, e.g., one or more data (D) disks and at least one (P) parity disk.

Whereas the aggregate 500 is analogous to a physical volume of a conventional storage system, a flexible volume is analogous to a file within that physical volume. That is, the aggregate 500 may include one or more files, wherein each file contains a flexible volume 510 and wherein the sum of the storage space consumed by the flexible volumes is physically smaller than (or equal to) the size of the overall physical volume. The aggregate utilizes a physical PVBN space that defines a storage space of blocks provided by the disks of the physical volume, while each embedded flexible volume (within a file) utilizes a logical VVBN space to organize those blocks, e.g., as files. Each VVBN space is an independent set of numbers that corresponds to locations within the file, which locations are then translated to dbns on disks.

F. VLDB

Figure 6:
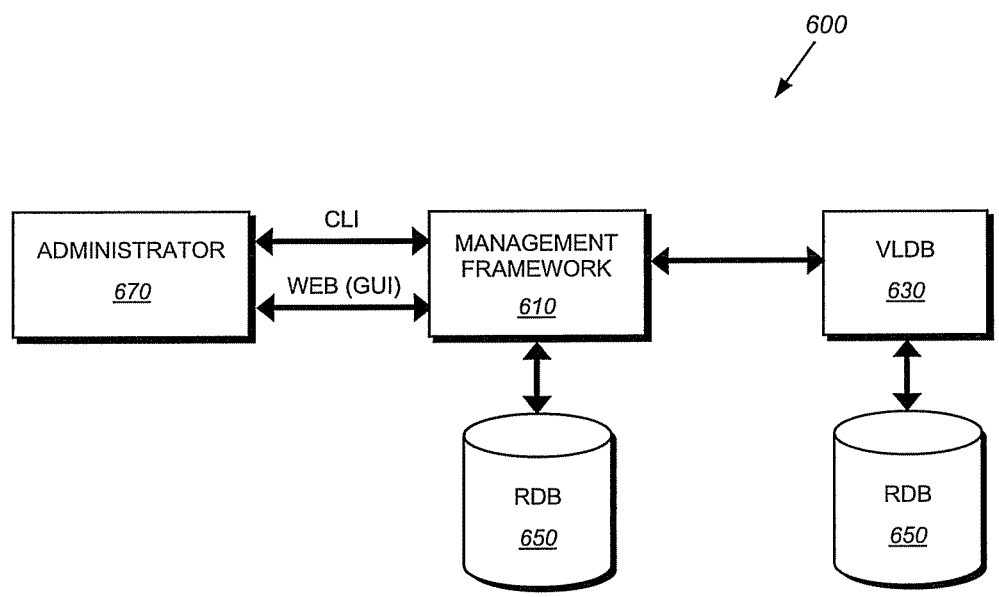
FIG. 6 is a schematic block diagram of a collection of management processes in accordance with an illustrative embodiment of the present invention.

FIG. 6 is a schematic block diagram illustrating a collection of management processes that execute as user mode applications 600 on the storage operating system 300 to provide management of configuration information (i.e., management data) for the storage systems/nodes of the cluster. To that end, the management processes include a management framework process 610 and a volume location database (VLDB) process 630, each utilizing a data replication service (RDB 650) linked as a library. The management framework 610 provides a user to an administrator 670 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 630 is a database process that tracks the locations of various storage components (e.g., aggregates) within the cluster 100 to thereby facilitate routing of requests throughout the cluster. The VLDB includes a plurality of entries which, in turn, provide the contents of entries in the configuration table 235; among other things, these VLDB entries keep track of the locations of the flexible volumes (hereinafter generally "volumes 510") and aggregates 500 within the cluster.

The VLDB illustratively implements a RPC interface, e.g., a Sun RPC interface, which allows the N-module 310 to query the VLDB 630. When encountering contents that are not stored in its configuration table, the N-module sends an RPC to the VLDB process. In response, the VLDB 630 returns to the N-module the appropriate mapping information, including an identifier (ID) of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 600.

To that end, the management processes have interfaces to (are closely coupled to) RDB 650. The RDB comprises a library that provides a persistent object store (storing of objects) for the management data processed by the management processes. Notably, the RDB 650 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

F. Striped Aggregates

As noted, according to one or more embodiments described herein, redundancy-protected aggregates are configured so that if one aggregate of the cluster fails, a storage system of the cluster can reconstruct the data which would be otherwise inaccessible by the cluster. For instance, striped aggregates illustratively comprise a plurality of constituent aggregates. Parity is distributed among the constituent aggregates based upon the number of constituent aggregates in the cluster and the arbitrary fixed-size "parity regions," wherein within each region only one constituent aggregate is assigned as the parity owner.

Figure 7:
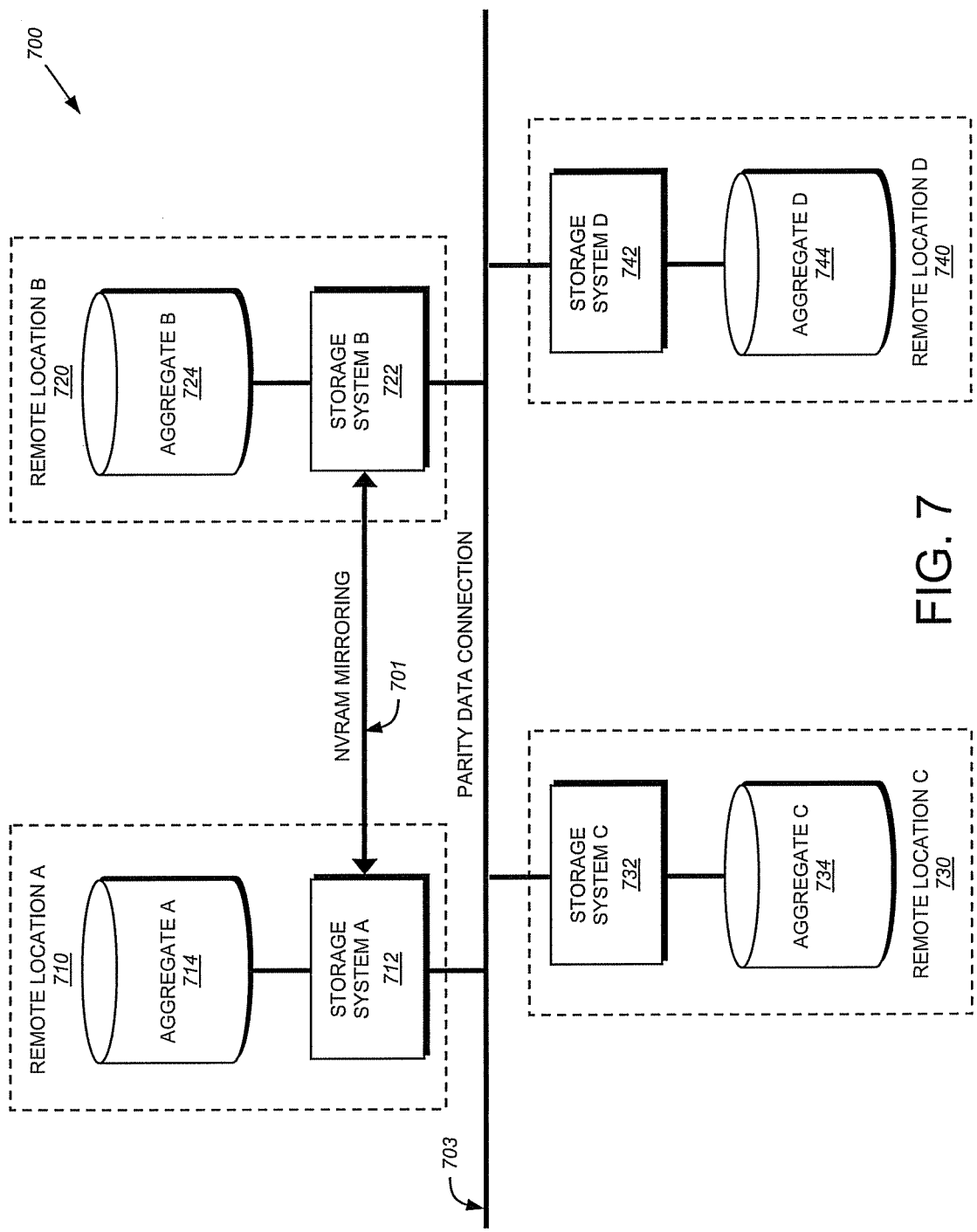
FIG. 7 is a schematic block diagram of a storage system cluster configured to implement striped aggregates in accordance with an illustrative embodiment of the present invention.

FIG. 7 is a schematic block diagram of a storage system cluster configured to implement striped aggregates 700 in accordance with an illustrative embodiment of the present invention. The striped aggregates 700 illustratively comprise four constituent aggregates A-D (714, 724, 734, and 744, respectively) residing on storage systems A-D (712, 722, 732, and 742 respectively). Storage systems A-D, as shown in the illustrative embodiment of the present invention, may reside in remote locations A-D (710, 720, 730, and 740, respectively) so that if there is a catastrophic failure at one location, the other locations may survive the failure. The storage systems are interconnected by a parity connection 703. Parity connection 703 is a communication medium that may be implemented through the use of an Ethernet connection or any other inter-cluster network connection, such as well-known Internet connections.

Striped aggregates 700 as described herein are made up of N aggregates, each of which is illustratively built of local RAID shelves operatively interconnected within storage systems A-D. In accordance with an illustrative embodiment, data for constituent aggregate A is stored on storage devices locally attached to storage system A. Additionally, operations that affect aggregate A cause parity to be updated elsewhere in striped aggregates 700. Furthermore, constituent aggregate A (714) is illustratively designated as a failover partner of storage system B 724. A failover partner is utilized to obtain redundancy information (e.g., parity) in the case of failure by an aggregate in the striped aggregates 700. This means that if aggregate A (714) were to fail, the client 170 would still be able to access the information using partner aggregate B (724) based on the parity stored on constituent aggregates (e.g., B-D). For instance, if storage system A fails, storage system B is responsible for taking over storage system A's role in cluster by, e.g., simulating access to the disks in aggregate A (714) to perform reverse parity computations from the remaining data available in the other constituent aggregates (described further herein). Furthermore, NVRAM mirroring (701) is applied between an aggregate and the aggregate's failover partner. For example, if aggregate B is aggregate A's failover partner, information stored in the NVRAM 232 on aggregate A is also stored on the NVRAM in aggregate B.

Figure 8:
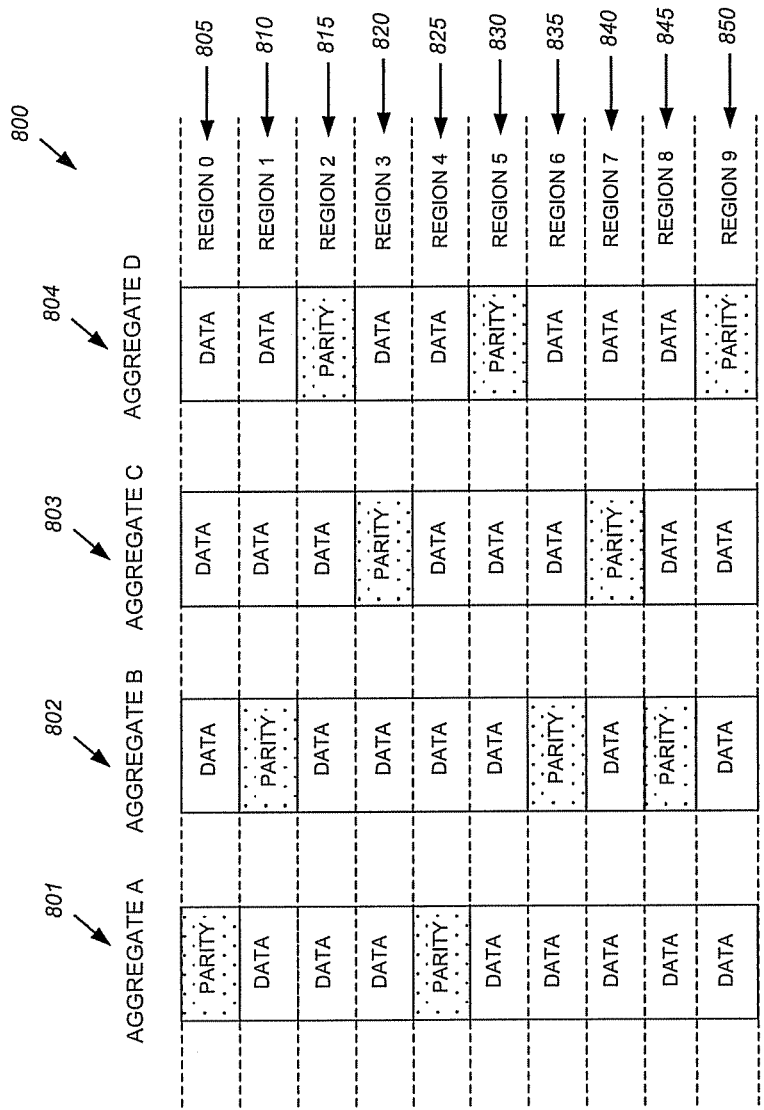
FIG. 8 is a schematic block diagram of illustrating distribution of parity in parity protected striped aggregates in accordance with an illustrative embodiment of the present invention.

FIG. 8 is a schematic block diagram illustrating distribution of parity in parity protected striped aggregates 800 in accordance with an illustrative embodiment of the present invention. Here, the striped aggregates are made up of constituent aggregates A-D of the storage system cluster. In illustrative striped aggregates 800, each constituent aggregate (801-804) reserves 1/Nth of its own storage space capacity for storing redundancy information from the other constituent aggregates, where N is the number of constituent aggregates. Thus, for any given physical volume block number (PVBN), N-1 of the constituent aggregates ("consumers") use that offset to store their own data. The Nth constituent aggregate (the parity owner for the offset) stores redundancy information (e.g., parity and/or checksum) of the other constituent aggregates' data at that same off-set, i.e., rather than storing its own data there.

Furthermore, in order to prevent the cluster from introducing a performance bottleneck, the parity ownership role is distributed. The PVBN range of striped aggregates 800 (See FIG. 8, FIG. 9, and FIG. 10) is divided into arbitrary fixed size "parity regions" 805-850. Within regions 805-850, one constituent aggregate is assigned as the parity owner. In the exemplary embodiment, aggregate A (801) is responsible for parity within parity region 0 (805) and region 4 (825). At any given time, for any PVBN within either region 0 or 4, the corresponding block in aggregate A stores redundancy information for data contained in the equivalent PVBNs in aggregates B (802), C (803) and D (804). Ownership of the parity region may be distributed using the process as described in U.S. Patent Publication DATA ALLOCATION WITHIN A STORAGE SYSTEM ARCHITECTURE, by Richard Jernigan et al., 2006/0248273, now issued as U.S. Pat. No. 7,617,370 on Nov. 10, 2009, the contents of which are hereby incorporated by reference. The algorithm described therein, as applied to aggregates, prevents a constituent aggregate (i.e., its associated parity protection module 370) from being designated as a parity owner more often than any other constituent aggregate. In addition to balanced consumption, the algorithm also prevents the cluster from "hotspotting," meaning that the parity protection module may not assume parity ownership for multiple consecutive regions in an aggregate. Finally, the algorithm renders addition or subtraction of aggregates easier, for example, as described below (e.g., FIG. 10 and FIG. 11).

Figure 9:
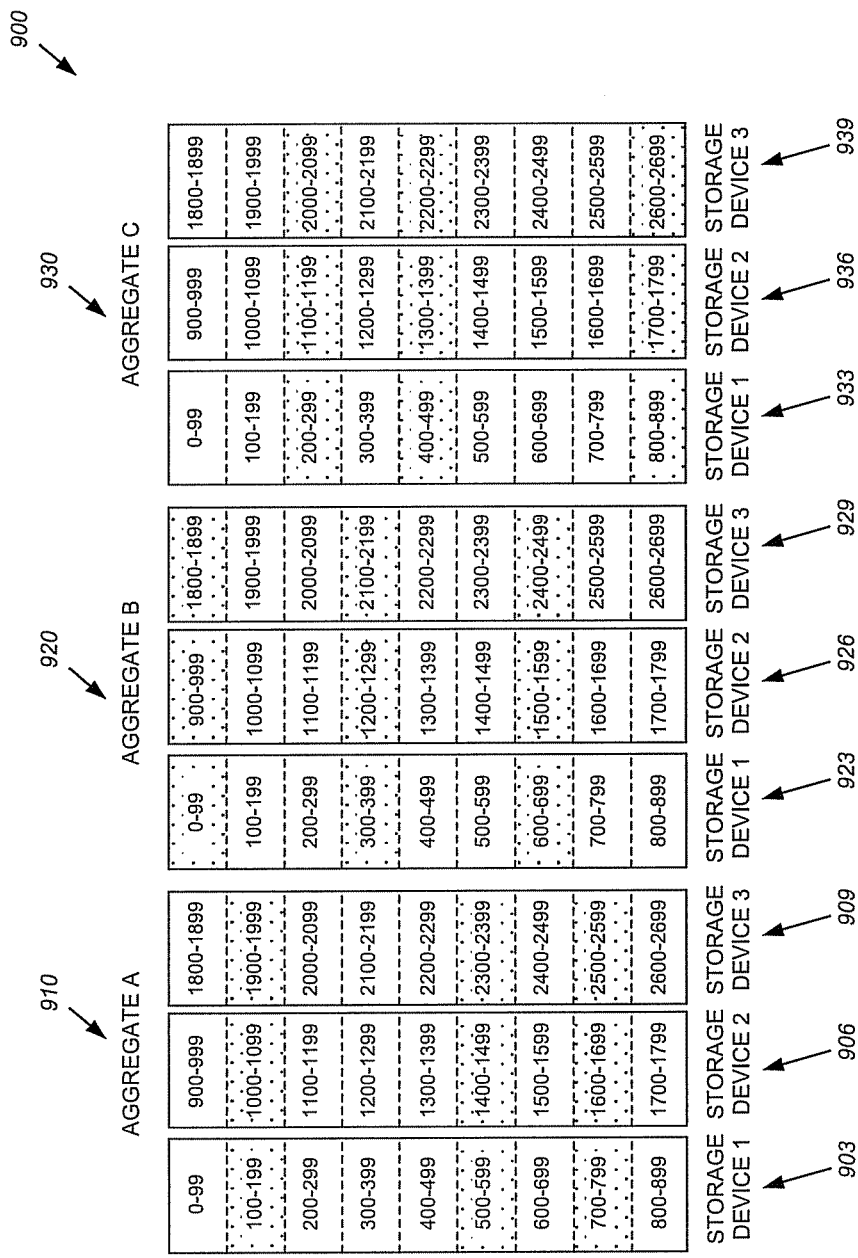
FIG. 9 is a schematic block diagram of an illustrative embodiment of striped aggregates in accordance the present invention.

FIG. 9 is a schematic block diagram of an illustrative embodiment of striped aggregates 900, which comprise constituent aggregates A-C (910, 920, and 930) respectively, in accordance with the present invention. Exemplary aggregate A comprises storage devices 903, 906, and 909, which are further appointed into illustrative PBVN ranges 0-2699 in offsets of 100. Thus, the first PVBN range in storage device 1 (903) is 0-99. Additionally, the aggregates as noted above are also appointed into nine illustrative regions. Therefore, according to an illustrative embodiment, PVBN ranges 0-99, 900-999, and 1800-1899 are located in the same region but not in the same range or storage device. An exemplary storage devices described in herein may be any kind of storage device (e.g., a RAID shelf made up of many disks, flash storage, etc.). In striped aggregate 900, redundancy information (e.g., parity) may be distributed over constituent aggregates A-C so that for every region, only one aggregate stores parity in that specific region. Thus, in region 1 (refer to FIG. 8) of the striped aggregate, parity is only stored on aggregate B, while in region 2, aggregate A stores the parity, etc. Furthermore for every region that stores parity in an aggregate, each PVBN in that aggregate's region illustratively also stores parity. For example, aggregate A's region 2 stores parity in PVBN ranges 100-199, 1000-1099, and 1900-1999 across storage devices 903, 906 and 909. In an illustrative embodiment, every aggregate has an equal number of storage devices, and regions, thus PVBN ranges may be similarly assigned, accordingly.

Figure 10:
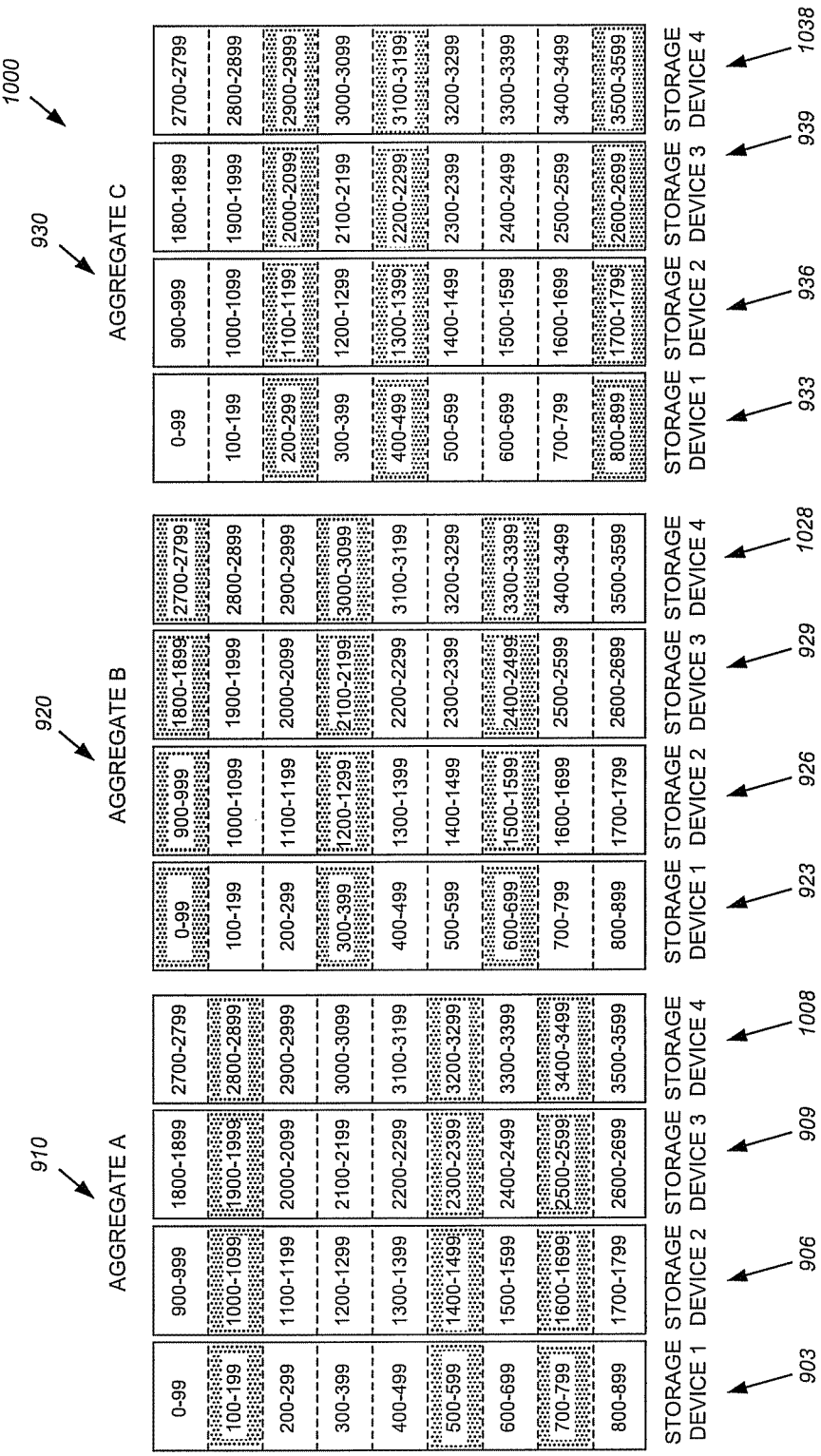
FIG. 10 is a schematic block diagram illustrating addition of a disk to striped aggregates system in accordance with an illustrative embodiment of the present invention.

Notably, redundancy protected aggregates may be expanded by either adding a storage device to each constituent aggregate in the cluster or by adding a new constituent aggregate to the cluster. FIG. 10 is a schematic block diagram illustrating addition of storage devices, e.g., a fourth storage device to existing storage devices (storages devices 1008, 1028, and 1038, respectively) of striped aggregates 900 in accordance with an illustrative embodiment of the present invention. Note that the ranges with no shading in the added storage devices represent zero-filled ranges, i.e., PVBN ranges that have yet to be populated. The PVBN ranges that are shaded in the newly added storage devices are parity owner regions which are only populated with parity on that particular aggregate. By adding the same geometry to every constituent aggregate a new parity owner region is an XOR of PVBN blocks from the corresponding previously populated parity owner regions.

Figure 11:
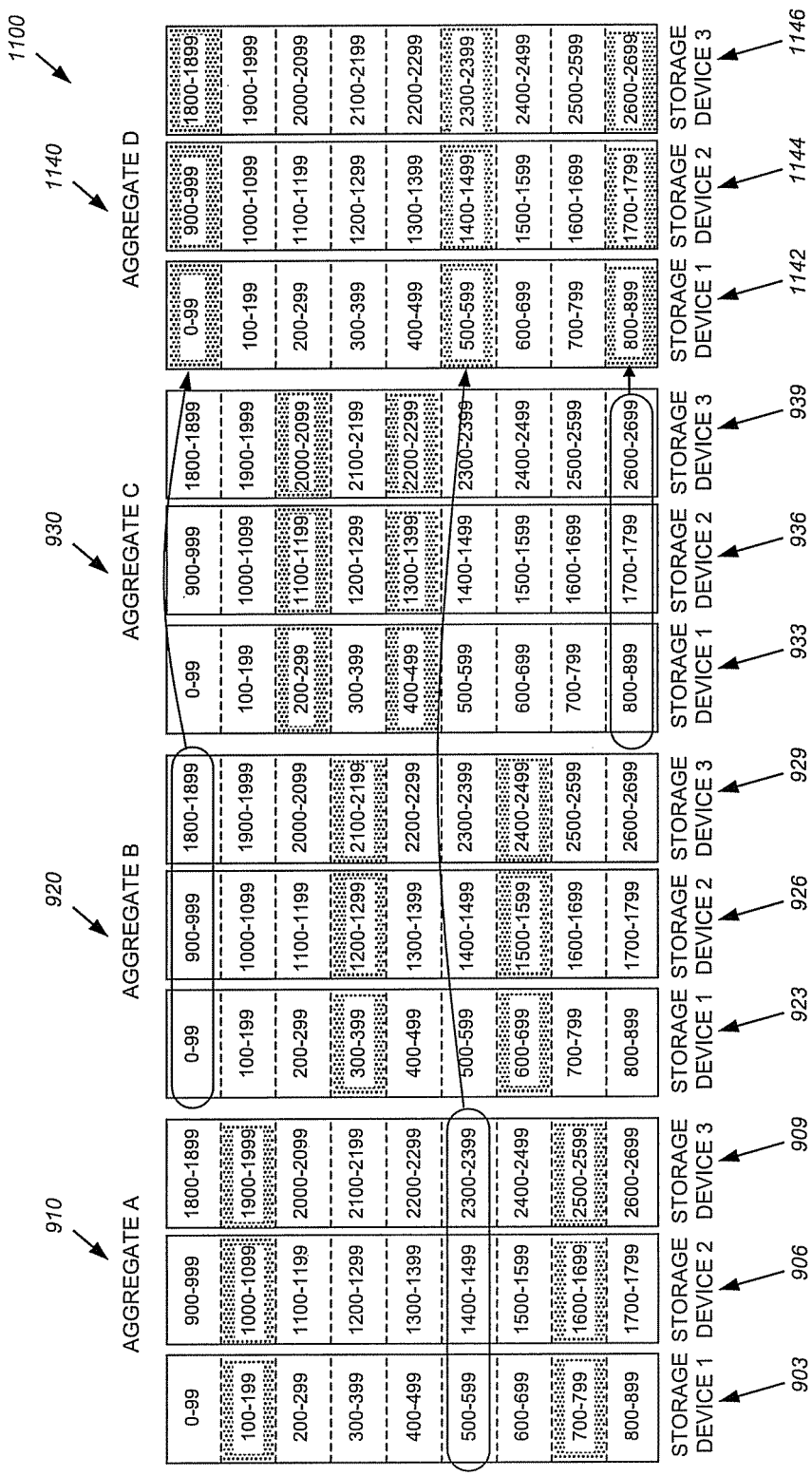
FIG. 11 is a schematic block diagram illustrating addition of an aggregate to striped aggregates system in accordance with an illustrative embodiment of the present invention.

FIG. 11 is a schematic block diagram illustrating an addition of an aggregate (fourth aggregate D, 1140) to striped aggregates 900 (above) in accordance with an illustrative embodiment of the present invention. Here, parity regions are reassigned from aggregates A-C to D so that each aggregate includes 1/Nth of the parity contained in the entire striped aggregate. Regions 5, 0, and 8 of aggregates A (910), B (920), and C (930) of FIG. 9 may be transferred to regions 5, 0 and 8 of aggregate D (1140) respectively, thereby balancing the cluster so that no more than 1/Nth of the parity of the entire cluster is contained on one aggregate. Again by adding the same geometry to every constituent aggregate a new parity owner region is an XOR of PVBN blocks from the corresponding previously populated parity owner regions. That is the existing parity data is transferred out of some PVBN regions and onto the aggregate in their new corresponding PVBN regions. The PVBN regions from which the existing parity data was transferred are then left zero-filled and can be filled at a later time.

H. Striped Aggregates Operation and Operational Modes

Operationally, parity protection may illustratively utilize storage space in a persistent storage device of the storage system 200, such as NVRAM 232. As noted, each storage system may organize and allocate a "write-in-flight" (WIF) area in the NVRAM. Data stored in the WIF area coincides with the data being written to a block locally, such as data stored in a Non-Volatile Log (NVLOG) 233 (e.g., in response to a write request received at the "local" storage system). A parity update request is sent from a Send-WIF area 241, located in the WIF area of the NVRAM 232, to a remote storage system of the cluster (e.g., the parity owner aggregate). Records of both sending and receiving the requests may be stored in the Send-WIF area (on sending storage system) and Receive WIF area (of the receiving storage system). When the two requests have completed for a particular block of data, these records (entries) are removed from the NVRAM 232. As noted, the local storage system also organizes and allocates at least one Receive-WIF area 243 in the WIF area of the NVRAM 232. The Receive-WIF area 243 records data configured to ensure that the cluster can detect duplicate requests that attempt to perform the same parity update. In addition, the storage system organizes and allocates a Rebuild area/bitmap 245 of the NVRAM 232 for each aggregate owned by the system. The Rebuild area is initially clear and then populated during a degraded mode (described below) to indicate which parity regions of the aggregate have been "dirtied" (updated) and are rebuilt during recovery from a failed aggregate. These areas associated with NVRAM 232 reflect the number of parity updates that are currently outstanding at any given time in the cluster. Therefore, only when local data and parity updates have completed may the associated records be removed (flushed) from the NVRAM 232. In an illustrative embodiment of the present invention, the cluster (e.g., striped aggregates) is capable of running in various operational modes. For example, depending upon various states of the storage system, the striped aggregates may operate in a normal mode, or in a degrade mode, suspended mode, or rebuild mode, as described herein.

Certain information is temporarily and persistently stored in the NVLOG. The NVLOG 233 temporarily stores such information to increase the reliability and performance of the storage system. Write data received and processed by the storage system is illustratively written to disk during a consistency model event, e.g., a Consistency Point (CP). Illustratively, the CP may be initiated when a predetermined portion (e.g., one half) of the NVLOG is filled. In response, the storage system flushes the write data to both its local aggregate and the owner of the corresponding parity block in the cluster. This process is known as normal mode. Upon completion of the CP, the storage system can then discard/remove the information from the NVRAM 232.

In particular, in normal mode, the parity protection module 370 of the local storage system responds to a write request for new data by reading the data currently in the block to be overwritten, computing an XOR for the new data and current data, and creating a new Send-WIF record to store both the new data and the redundancy information (parity) in the NVLOG 233. As soon as the write request is acknowledged by the parity storage system (parity owner), the storage system sends a write response back to the client. In parallel, the storage system writes the information (e.g., write data) stored by the NVLOG 233 to its local aggregate and sends a request to the owner of the parity block (the parity owner) for an XOR update. The parity owner then creates its own Receive-WIF record by writing a transaction ID and a computed XOR in the parity owner's NVLOG. The parity owner then returns a success response to the local parity protection module 370. Thereafter, the parity owner writes the computed XOR to disk, thereby allowing the XOR to be deleted from the NVLOG.

At the same time, the data stored on the local NVLOG 233 is removed once the data has been written to the local aggregate. The XOR-value, however, may be removed once the parity owner responds that the parity has been successfully stored on the parity owner's NVLOG. When both the local data and parity updates have been removed from the NVLOG, the parity protection module of the locally attached aggregate discards the transaction ID. Finally, at the end of the CP, the storage system makes one last purge call to the NVLOG 233 to ensure that all transactions have been removed.

Figure 12:
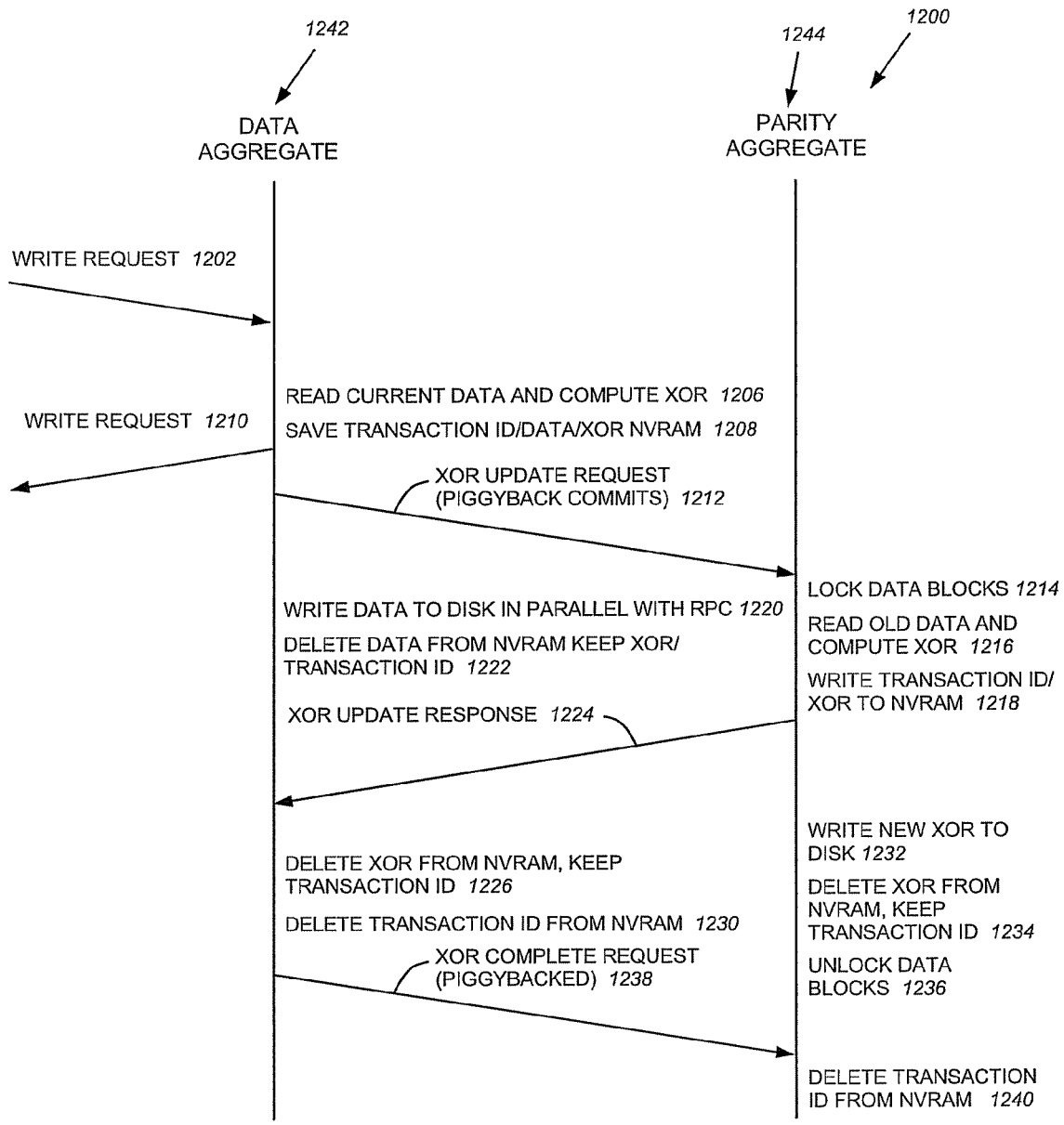
FIG. 12 is a schematic timing diagram representing a process performed by striped aggregates in normal mode in accordance with an illustrative embodiment of the present invention.

FIG. 12 is a schematic timing diagram representing a process performed by striped aggregates in normal mode in accordance with an illustrative embodiment of the present invention. When a write request is received in step 1202 by a local storage system of the cluster (i.e., a locally attached data aggregate 1242) from a client (not shown), the parity protection module of the data aggregate responds by reading the data and computing an XOR in step 1206. The parity protection system simultaneously creates a new Send-WIF record to store both the new data and the XOR data in the NVLOG. If there is insufficient space in the Send-WIF area 241 to create another record, then the data aggregate stalls until the space is released. If space is available, the NVLOG 233 stores a transaction ID and the parity protection module computes the XOR in step 1208. Once the record is created on the NVLOG, a write response is sent back to the client indicating that the write request has completed.

Next in step 1213, an XOR update request is sent from the parity protection module of the data aggregate to the parity owner (i.e., parity aggregate 1244). Any data that has been modified is written (in parallel) to disk (i.e., cached dirty data) in step 1220 on the data aggregate 1242. Once the data has been written to disk, the data is flushed/deleted from the NVLOG 233 in step 1222. The redundancy information and transaction ID, however are not deleted until an XOR response is received from the parity owner indicating that the redundancy information has been recorded on the parity owner's NVLOG 233 in step 1224. While steps 1220 and 1222 are processing, the parity aggregate 1244 illustratively operates in parallel. In step 1218, the parity aggregate writes a transaction ID and the redundancy information to the NVLOG and sends back a response to the parity protection module indicating that the XOR update has completed in step 1224. Then, the parity protection module of data aggregate can delete the redundancy information and transaction ID which were recorded on its NVLOG (steps 1226 and 1230). At the same time, the parity owner/aggregate 1244 writes the updated XOR to disk (step 1232), and deletes the XOR from its NVLOG, keeping the transaction ID until the parity protection module of data aggregate 1242 sends an "XOR complete" response back to the parity owner 1244 indicating the process is complete. At this time, the parity owner 1244 deletes the transaction ID (step 1240) from the NVLOG and the process repeats. In alternative embodiments, the data aggregate may "piggyback" requests to the parity owner in order to increase efficiency. Therefore, when sending the "XOR complete" request (step 1238), the data aggregate also sends a new XOR update request (step 1238) to the parity owner. (Notably, when receiving a read request while in normal mode, the data aggregate reads files in a conventional manner from their originally stored location on local disks of the data aggregate 1242, as will be understood by those skilled in the art.)

In particular, each aggregate not only stores its own data, but also stores some type of redundancy information (e.g., parity) for another constituent aggregate in the striped aggregate. As noted, when another storage system (the requestor) requests that parity be written to a remote storage system (i.e., the parity aggregate), the requester provides a target aggregate ID, a PVBN within the aggregate being written, an XOR indicating the difference between the old and new block data, and a unique transaction identifier (ID). The transaction ID is used to provide a set of semantics for the target.

Figure 13:
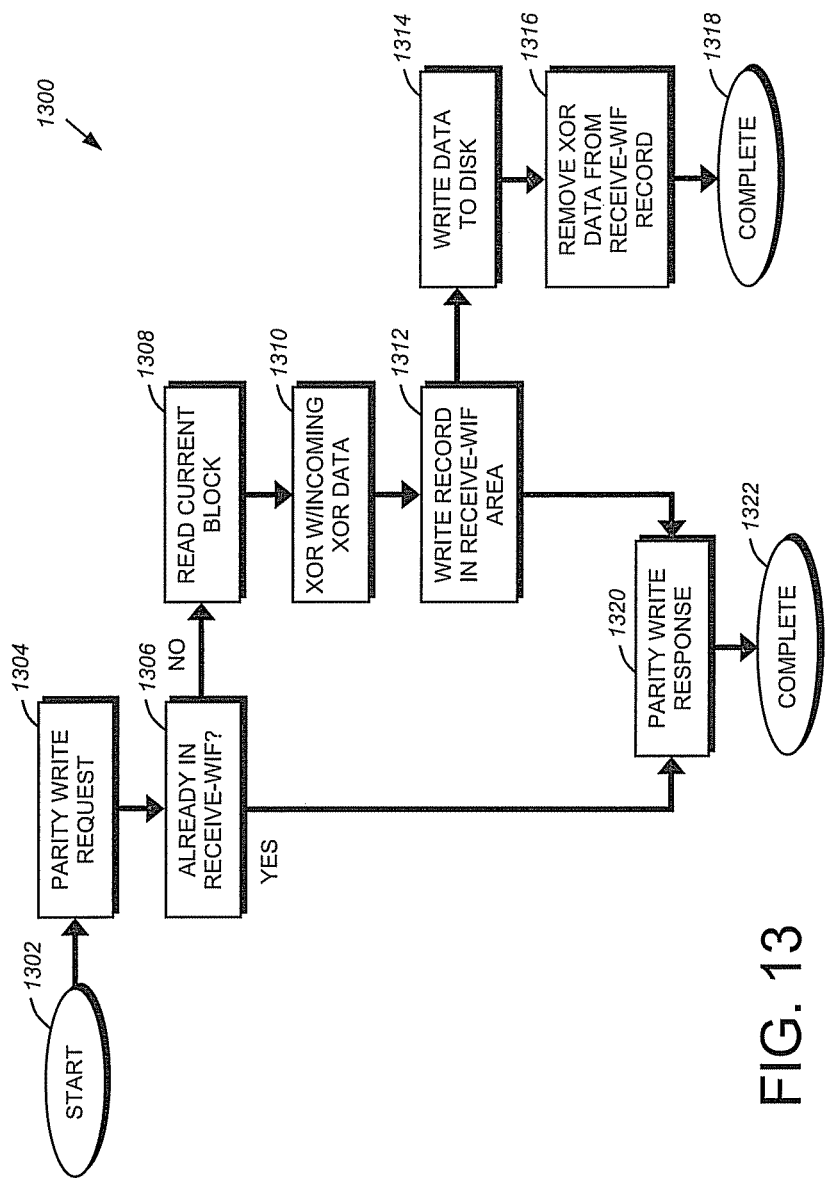
FIG. 13 is a flowchart illustrating a procedure for processing a parity write request in accordance with an illustrative embodiment of the present invention.

FIG. 13 is a flowchart illustrating a procedure 1300 for processing a parity write request in accordance with an illustrative embodiment of the present invention. The procedure 1300 begins in step 1302 and continues to step 1304 where a parity-write is received at a data aggregate, and a record is made in the Receive-WIF NVLOG area of that aggregate. Then, in step 1306, the local parity protection module determines whether or not a record with that same transaction ID already exists in the NVLOG of the data aggregate. If the transaction ID does exist, then the incoming parity write is a duplicate and can be ignored in order to prevent duplicating of the XOR process on the same aggregate. When a record is first written into the Receive-WIF area 243, the NVLOG records not only the transaction ID but also the XOR data itself, e.g., to ensure atomicity of the XOR write. Therefore, once it is determined that there is not an identical record in the NVLOG, the data aggregate reads the current block in step 1308. In step 1310, the block is XORed with the incoming XOR data. Once the redundancy information is complete, in step 1312 the parity protection module writes the XOR/parity computation to the Receive-WIF area 243 of the NVLOG, thereby allowing a response to be sent in step 1320 indicating that the write request in 1304 has completed in step 1322.

The Send-WIF area 241 associated with a particular aggregate also keeps track of any write requests for which an aggregate transmits a parity-write, illustratively in the form of records. In an illustrative embodiment, these records store additional information. That is, not only do the records store the transaction ID and XOR data, but the NVLOG 233 also stores the new (write) data which is being written to the data aggregate. Write data may also be stored in order to ensure that in the event of a failover, a constituent aggregate can complete the local write request exactly as the failed aggregate would have done.

Furthermore, transaction IDs may accumulate in the Receive-WIF over time. For example, upon restart, a storage system may not "remember" that a transaction ID needs to be "cleaned up" and therefore does not notify the storage system associated with the Receive WIF, that the transaction has been committed. Thus, each storage system will send periodic requests to other constituent storage systems that it holds transaction IDs, asking the constituent storage systems whether the transaction IDs are still valid, and thereby allowing the system to clean up old transactions when the response indicates that the transaction IDs are no longer in use.

Once an aggregate fails, the parity protected module transitions the aggregate/cluster to a degraded mode to retrieve the data requested by the client. In degraded mode, a write request is sent to an aggregate in the cluster while the primary storage for that aggregate is offline (i.e., a failed aggregate has been identified). The parity protection module first receives a write request on the failed aggregate. Note that a failed aggregate may be any aggregate in which the storage devices containing the data cannot be accessed; yet, the D module (i.e. its parity protection module) connected to the failed aggregate may be fully operationally in order to send and receive files from the client. The failed aggregate then sends a read request from its parity protection module to each remote aggregate hosting data for a plurality of target data blocks. Each read request results in locking of the target data blocks and retrieval of the data from the disk. Once the lock is in place on the remote aggregates, all updates to parity for the data blocks are fenced (i.e., no other storage system can modify the parity for the blocks at this time). With this fence in place, the failed aggregate's parity protection module may compute an XOR from all of the remote data blocks as well as the block to which the parity protection module wishes to write. Then the parity protection module on the failed aggregate writes the computed XOR and a transaction ID to the NVLOG 233 on the failed aggregate. The resulting computation is sent (via a write request) directly to the parity-owning aggregate's parity protection module and a write response is sent back to the client.

Figure 14:
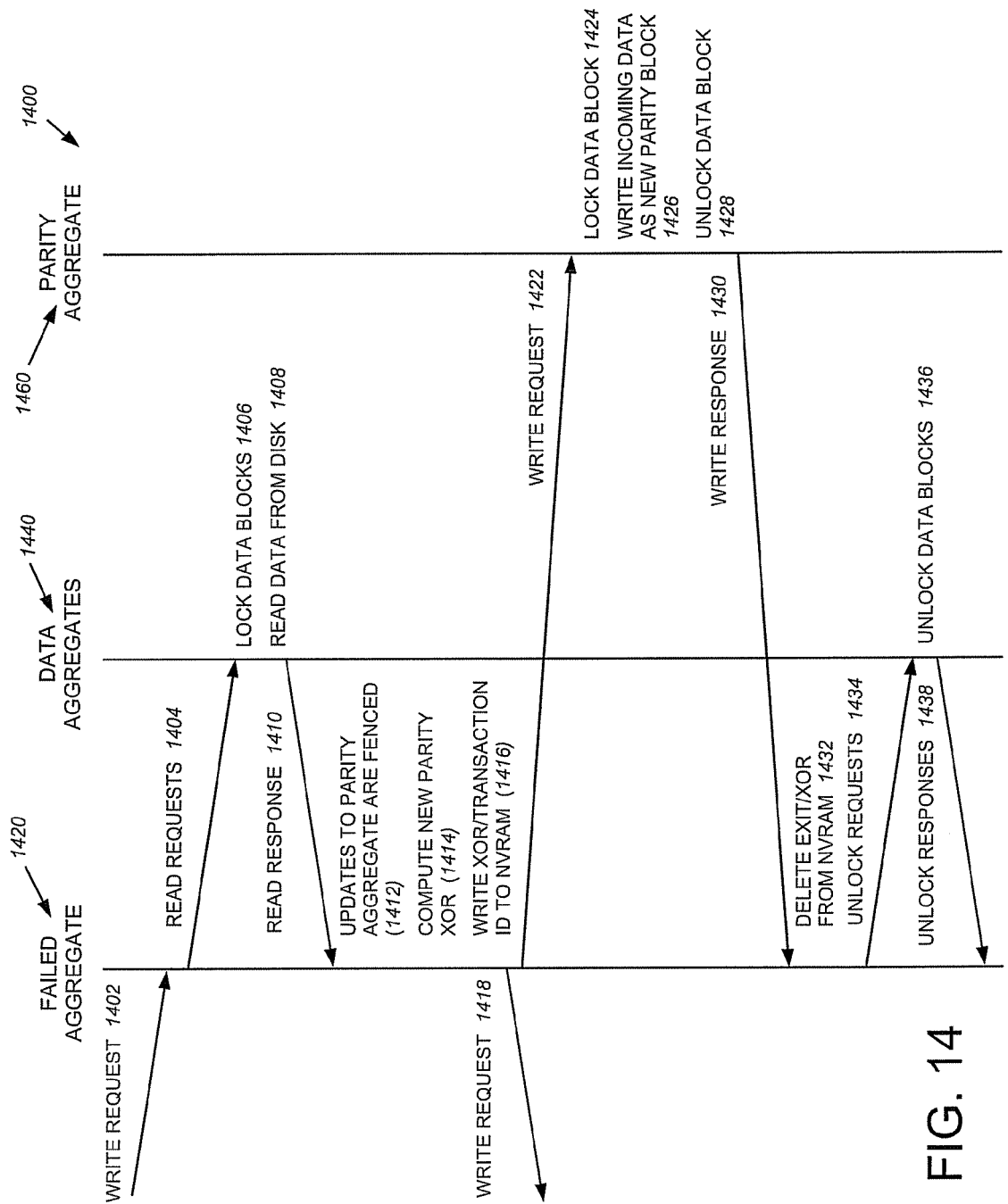
FIG. 14 is a schematic timing diagram illustrating performance of a write request on striped aggregates when the primary storage for a storage system is offline and the cluster is running in degraded mode in accordance with an illustrative embodiment of the present invention.

FIG. 14 is a schematic timing diagram illustrating performance of a write request on striped aggregates 1400 when the primary storage for a storage system is offline and the cluster is running in degraded mode (e.g., an aggregate fails and needs to be accessed by client before the aggregate is rebuilt).

In step 1402, a write request is received at a storage system (D-module) of failed aggregate 1420 from a client. The parity protection module of the D module sends a read request (step 1404) to the other constituent data aggregates 1440 where a plurality of target data blocks is locked (step 1406) and read from a corresponding disk (step 1408) located on each data aggregate 1440. Once a lock is set on each of the data aggregates, a read response is sent back to the failed aggregate, and updates that will be sent to a parity aggregate (i.e., the aggregate containing the parity associated with the failed aggregate) are fenced so that the parity for the blocks cannot be modified at that time (step 1412). With the fence in place, the parity protection module (of the corresponding aggregate) computes a new parity XOR (1414) for all of the remote data blocks and the current write request. The new parity XOR is then written along with a transaction ID to the NVLOG 233 on the failed aggregate 1420. At this time, a response is sent back to the client indicating that the write request has completed (step 1418). The parity protection module sends a write request to parity owner 1460 locking a target data block (step 1424), and writing the new incoming data (the computed XOR) as a new parity block (step 1426). The data blocks are unlocked and a write response is sent back to the parity protection module on the failed aggregate indicating that the write request has completed. At this time, the parity protection module on the failed aggregate deletes the transaction ID and redundancy information from its NVLOG (step 1432) thereby triggering an unlock response back to the parity protection module on the remote data aggregates 1440. Accordingly, the data blocks are unlocked (step 1436) and a response is sent back to the parity protection module on the failed aggregate (step 1438) indicating that the process has completed.

Notably, when a storage system issues a read request when the cluster is in degraded mode, its parity protection module performs a reverse parity computation to obtain the requested data. A reverse parity computation is performed by using the appropriate stored parity to determine the missing data value. In particular, when a read request is received by the failed aggregate while the cluster is in degraded mode, its parity protection module sends a read request to the other constituent data aggregates. The data is then read from a corresponding disk (i.e., each corresponding PVBN) located on each data aggregate. A read response is thereafter sent back to the parity protection module on the failed aggregate. The parity protection module (of the failed aggregate) computes the reverse parity XOR for all of the remote data blocks in order to determine the current read request. The reverse parity computation result may then be returned to the requesting client from the parity protection module of the failed aggregate, accordingly.

In an illustrative embodiment, the parity protection module of the failed aggregate proceeds to rebuild mode once the failed aggregate comes back online. First, the parity protection module of the failed aggregate sends a write request to the parity owner. This request locks each appropriate data block and writes the incoming data as an updated parity block on the parity owner. The parity owner's parity protection module then unlocks the data block and sends a write response back to the parity protection module of the failed aggregate. The failed aggregate's parity protection module then deletes the XOR and the transaction ID from the NVLOG 233 and sends an unlock request back to the remote data aggregates to allow the target data blocks to be unlocked for access by the D modules of other constituent aggregates. Finally, the process completes when all of the parity protection modules of the constituent aggregates have sent an unlock response back to the parity protection module on the failed aggregate indicating that it is safe to return to normal mode.

Rebuilding is performed utilizing a rolling fence directed to one parity region at a time. Parity regions "behind" the fence (e.g., already traversed regions) have been rebuilt and are accessed in accordance with normal mode operation. In contrast, parity regions "ahead" of the fence are accessed in accordance with degraded mode operation. The parity region being actively rebuilt is fenced, and all access to that region stalls while the region is being rebuilt.

Figure 15:
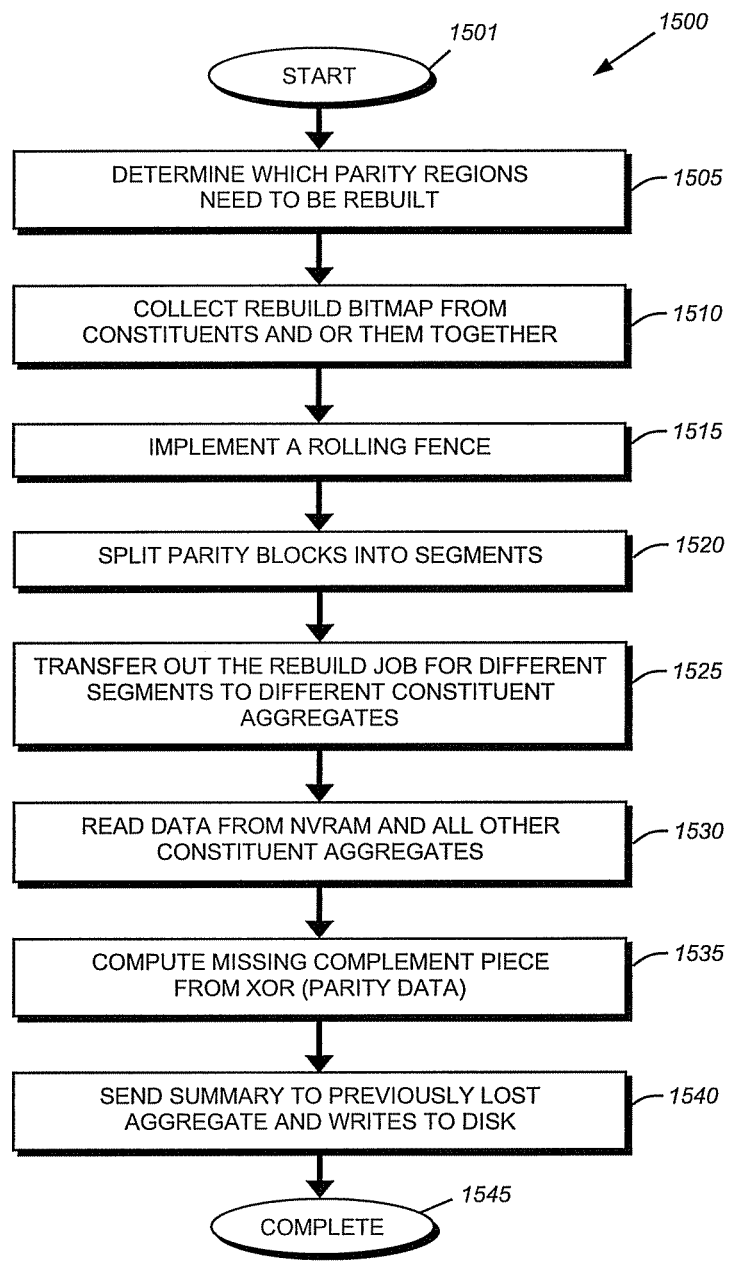
FIG. 15 is a flowchart illustrating a procedure for a rebuilding process undertaken by the cluster in accordance with an illustrative embodiment of the present invention.

FIG. 15 is a flowchart illustrating procedure for a rebuilding process undertaken by the cluster in accordance with an illustrative embodiment of the present invention. The rebuilding process is illustratively undertaken when a failed aggregate returns to the cluster and/or is replaced in order to "catch up" with the rest of the cluster. The rebuild process begins with step 1505 by determining which parity regions need to be rebuilt. If the striped aggregates are reconstructing a failed aggregate that requires reinitialization, then all parity regions are rebuilt. If, however, the striped aggregates are reconstructing a previously-failed aggregate that was e.g., offline ("down"), then the parity protection module collects a Rebuild bitmap 245 from all constituents and logically combines (e.g., ORs) them to decide which regions have been dirtied while this failed aggregate was down (Step 1510). A rolling fence then proceeds from one dirty region to the next (step 1515), so if a failure was short-lived, the rebuild period will also be short-lived.

In step 1525, a parity region is rebuilt by splitting the parity region blocks into segments, and transferring the rebuild job for different segments to different constituent aggregates (step 1530). To rebuild a segment, a previously failed aggregate's parity protection module reads data from its own NVLOG 233 and all other constituent aggregates (step 1535), computes the missing complement piece (step 1540), such as through a reverse parity computation (mentioned above), and sends that piece ( e.g., a summary) back to the previously-failed aggregate, which then writes the data to disk (1550). The rebuild process may be throttled, to ensure that no more than N rebuild-segment requests are in flight simultaneously. Note that, the larger the value of N, the faster the rebuild completes, but the less responsive the cluster will be for all other traffic during rebuilding. Furthermore, a parity region is illustratively expected to be a predetermined size (e.g., 100 MB), and the size of a single rebuild segment will be influenced by the amount of data that can be sent or received on a single CF call.

Figure 16:
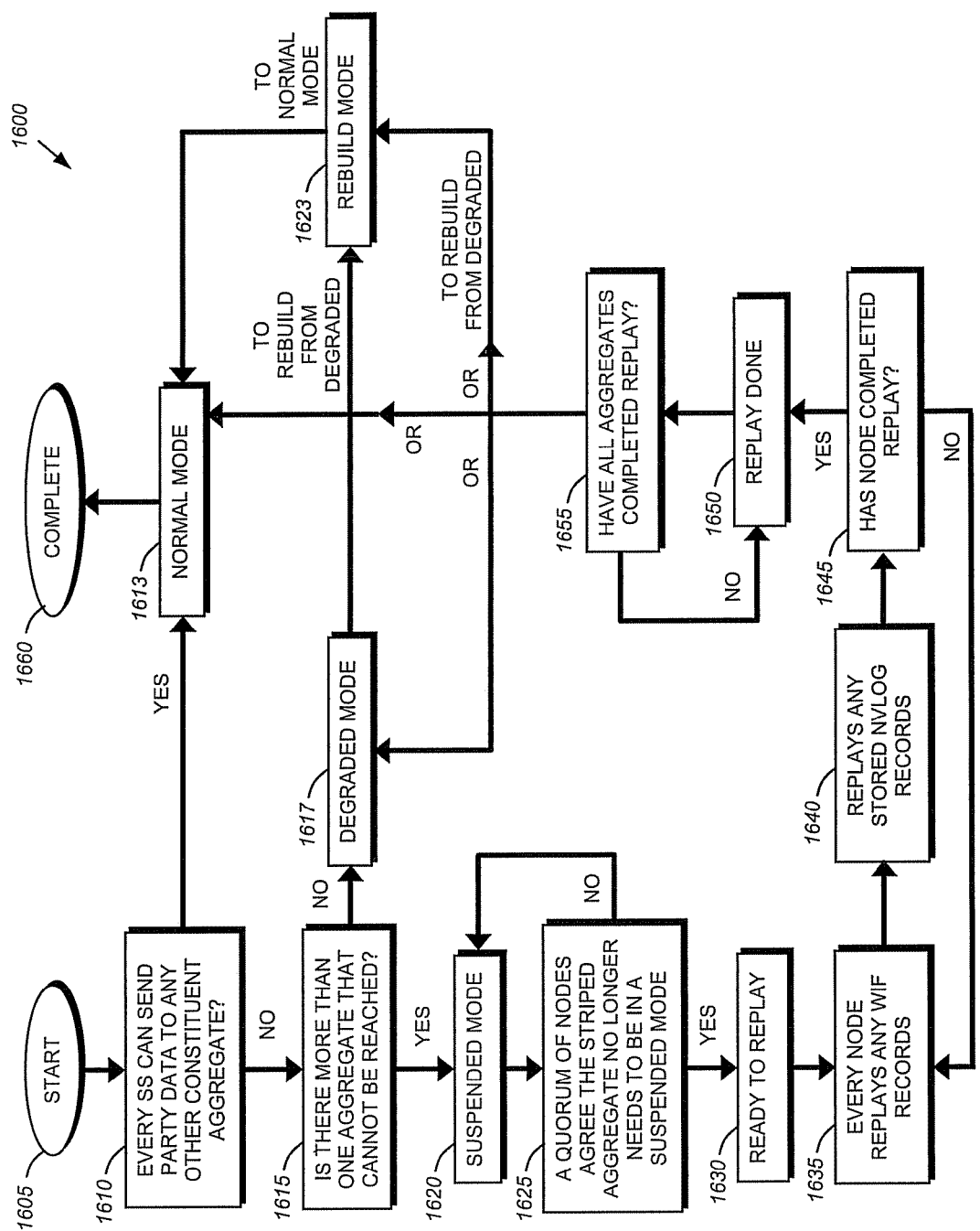
FIG. 16 is a flowchart illustrating a procedure for determining the operational mode of striped aggregates in accordance with an embodiment of the present invention

FIG. 16 is a flowchart illustrating a procedure 1600 for determining the operational mode of striped aggregates in accordance with an embodiment of the present invention. (Note that the current operational mode of the striped aggregate (i.e., cluster) may be tagged with an era, which is an integer value that increments whenever the operational mode changes. Additionally the operational mode for striped aggregates is recorded persistently within the VLDB 630.) Upon moving from startup (step 1605), the cluster determines which mode to enter by first having each relevant storage system maintain an array of its own health. A storage system's health is defined by whether it can direct parity writes to all of the constituents in the striped aggregates in step 1615. The storage system's health is updated continually through normal parity write attempts as well as through periodic health queries run by the storage operating system. Based on this array of information, the storage system decides which mode it believes the overall striped aggregates should assume. If every aggregate's parity protection module is capable of sending parity to any other constituent aggregate, then the parity protected module decides that the cluster should be in normal mode (step 1613).

If data cannot be written to exactly one aggregate in the cluster, then a broadcasting node determines that the parity protection modules of the cluster are in degraded mode (step 1617) when an aggregate cannot be reached. Degraded mode is further qualified by which aggregate in the cluster is lost due to failure. Furthermore, in addition to qualifying the failed aggregate, the degraded mode also qualifies which aggregate will be simulating the failed aggregate (i.e., the failover partner of the failed aggregate). When the striped aggregates enter degraded mode, the VLDB 630 records the striped aggregate's current state. If there is more than one failed aggregate (or if the striped aggregates have trouble reaching two or more aggregates) then the parity protection modules in the cluster transitions to suspended mode in step 1620. The decision to remain in suspended mode is complicated by the current state of the striped aggregates. This means that if an aggregate is dirty (e.g., fails while degraded mode is running), then any second failure requires the striped aggregate to enter suspended mode.

A storage system may examine/analyze its health status to decide on an operational mode that does not match the current mode of the striped aggregate. When it renders a decision to change modes, the storage system (e.g., a broadcasting node configured as such by a system administrator) sends a request to all the other storage systems of the striped aggregates to change to normal (healthy) mode, degraded mode, etc. Each of the storage systems then receives the request and tests itself to determine if the request is compatible with its own health. Once the test is complete, each of the other storage systems responds to the request with a success or a failure. After collecting all of the responses from all of the storage systems, the broadcasting node evaluates the response to determine whether a quorum of the storage systems wish to proceed to replay. Therefore, the striped aggregates remain in suspended mode until a quorum of storage systems agree that the striped aggregates no longer needs to remain in suspended mode in step 1625. Once there is a quorum of storage systems in agreement, the striped aggregate/cluster proceeds to replay mode (step 1630), where it waits for a replay of the data to begin. Here, every node/storage system of the cluster replays any WIF records recorded on the NVLOG in order to synchronize/change the striped aggregates (step 1635). In step 1640, any NVLOG records stored while the cluster was in suspended mode are replayed. After a storage system has completed its replay procedure in step 1645, the completed aggregate translates to "replay done" mode (step 1650), and awaits a message from the broadcasting node that all of the aggregates in the cluster have completed replay in step 1655.

Thereafter, the broadcasting node once again begins sending and receiving requests and responses from the storage systems to determine the operating mode of the striped aggregates (cluster). At this point, the cluster can proceed to degraded mode, normal mode, or rebuild mode (step 1623). If the broadcasting node decides to first enter degraded mode, however, the cluster transitions to rebuild mode before entering healthy/normal mode, thereby finally completing in step 1660. (Notably completion in step 1660 may imply a restart (step 1605) to update the status of whether the cluster is to remain in normal mode or not based on failure of one or more aggregates.)

To again summarize, the present invention provides a system and a method for utilizing a parity protection module to back up data on striped aggregates. Specifically, the parity protection module computes parity for data stored at a particular location of each of a plurality of constituent aggregates, and stores the parity on one of the constituent aggregates that is a parity owner for that particular location of data. In the event one of the constituent aggregates fails, data may still be accessed by the striped aggregates, both to write data, and to read data stored on the failed aggregate. In particular, the parity protection module allows clients to read data from a failed aggregate by performing a reverse parity computation, which may also be used to restore the data to the failed aggregate.

The foregoing description has been directed to specific embodiments of this invention. It will be apparent that other variations and modifications may be made to the described embodiments, with the attainment of some or all of their advantages. For example, it is expressly contemplated that the teachings of this invention can be implemented, including a computer readable medium having program instructions executing on a computer, hardware, firmware, or a combination thereof. Additionally, while this description is written in terms of striped aggregates over parity protected modules, it should be noted that other data container implementations may be utilized. As such, the use of redundancy information (e.g., parity) to support the parity protected modules should be taken as exemplary only. Accordingly this description is to be taken only by way of example and not otherwise limit the scope of the invention. It is thus the object of the appended claims to cover all such variations and modifications as come within the true spirit and scope of the invention.

What is claimed is:

1. A method, comprising:

organizing a plurality of constituent aggregates as striped aggregates, the constituent aggregates implemented across a plurality of nodes operatively connected as a cluster, wherein each constituent aggregate includes a plurality of storage devices organized into one or more Redundant Arrays of Independent Disk (RAID) groups, wherein each constituent aggregate further includes a first equal number of regions, and wherein each constituent aggregate reserves 1/Nth of storage space capacity to store redundancy information from the other constituent aggregates where N is a number of the plurality of constituent aggregates;

assigning, for a second number of regions across the plurality of constituent aggregates, a single aggregate as a parity owner aggregate;

storing data received from a client at a selected constituent aggregate of the plurality of constituent aggregates;

computing redundancy information for the data stored at the selected constituent aggregate based on a logical operation between the data stored at the selected constituent aggregate with other data stored at other constituent aggregates of the plurality of constituent aggregates; and storing the computed redundancy information for the data stored at the selected constituent aggregate on the assigned parity owner aggregate.

2. The method of claim 1, wherein computing the redundancy information comprises:

storing the data, computed redundancy information, and one or more identifiers associated with the data to a non-volatile storage device of a node of the plurality of nodes in the cluster; and sending a response to the client in response to storing the data to the non-volatile device.

3. The method of claim 1, wherein storing the computed redundancy information on the parity owner aggregate comprises:

storing one or more parity identifiers associated with the computed redundancy information to a non-volatile storage device of a node of the plurality of nodes in the cluster;

sending a first response to the selected constituent aggregate in response to storing the one or more parity identifiers to the non-volatile storage device; and in response to storing the computed redundancy information to the parity owner aggregate, sending a second response to the selected constituent aggregate.

4. The method of claim 3, wherein the data is stored at the selected constituent aggregate at a first offset that is within a physical volume block number (PVBN) space.

5. The method of claim 4, further comprising: determining that the selected constituent aggregate has failed and is a failed constituent aggregate after receiving a write request directed towards the striped aggregates; and in response to determining that the selected constituent aggregate has failed, initializing a procedure to read from the parity owner aggregate and one or more other constituent aggregates.

6. The method of claim 5, further comprising:

sending a read request to the parity owner aggregate;

performing a reverse parity computation by a parity protection module of a node of the plurality of nodes associated with the parity owner aggregate;

utilizing the reverse parity computation to read data from the failed constituent aggregate; and sending a read response to a broadcasting node of the plurality of nodes.

7. The method of claim 6, further comprising restoring the failed constituent aggregate utilizing a rebuilding procedure.

8. The method of claim 1, wherein a RAID implementation of the one or more RAID groups comprises a RAID-4 implementation.

9. The method of claim 1, wherein the logical operation is an exclusive OR (XOR) operation between the data stored at the selected constituent aggregate and the other data stored at the other constituent aggregates of the plurality of constituent aggregates.

10. The method of claim 1, wherein the parity owner aggregate stores the redundancy information at physical volume block numbers (PVBNs) for the data stored at equivalent PVBNs in the selected constituent aggregate.

11. A system for utilizing a striped data container to back up a storage system, comprising:

a plurality of storage systems each including a processor, the plurality of storage systems configured to connect as a cluster, the plurality of storage systems further configured to organize a plurality of constituent aggregates as striped aggregates, wherein each constituent aggregate includes a plurality of storage devices organized into one or more Redundant Arrays of Independent Disk (RAID) groups, wherein each constituent aggregate further includes a first equal number of regions, and wherein each constituent aggregate reserves 1/Nth of storage space capacity to store redundancy information from the other constituent aggregates where N is a number of the plurality of constituent aggregates;

a parity owner aggregate assigned for a second number of regions across the plurality of constituent aggregates;

a selected constituent aggregate of the plurality of constituent aggregates configured to store data received from a client;

one or more of the plurality of storage systems further configured to compute redundancy information for the data stored at the selected constituent aggregate based on a logical operation between the data stored at the selected constituent aggregate and other data stored at other constituent aggregates of the plurality of constituent aggregates; and one of the other constituent aggregates, assigned as the parity owner aggregate, configured to store the computed redundancy information for the data stored at the selected constituent aggregate.

12. The system of claim 11, wherein computing the redundancy information comprises one or more of the plurality of storage systems further configured to:

store the data, computed redundancy information, and one or more identifiers associated with the data to a non-volatile storage device operatively connected in the cluster; and send a response to the client in response to storing the data to the non-volatile device.

13. The system of claim 11, wherein storing the computed redundancy information on the parity owner aggregate comprises one or more of the plurality of storage systems further configured to:

store one or more parity identifiers associated with the computed redundancy information to a non-volatile storage device of a node of the plurality of nodes in the cluster;

send a first response to the selected constituent aggregate in response to storing the one or more parity identifiers to the non-volatile storage device; and send, in response to storing the computed redundancy information to the parity owner aggregate, a second response to the selected constituent aggregate.

14. The system of claim 13, wherein the data is stored at the selected constituent aggregate at a first offset that is within a physical volume block number (PVBN) space.

15. The system of claim 14, wherein one or more of the plurality of storage systems is further configured to:

determine that the selected constituent aggregate has failed and is a failed constituent aggregate after receiving a write request directed towards the striped aggregates; and initialize, in response to determining that the selected constituent aggregate has failed, a procedure to read from the parity owner aggregate and one or more other constituent aggregates.

16. The system of claim 15, wherein one or more of the plurality of storage systems is further configured to:

send a read request to the parity owner aggregate;

perform a reverse parity computation by a parity protection module of at least one of the plurality of storage systems associated with the parity owner aggregate;

utilize the reverse parity computation to read data from the failed constituent aggregate; and send a read response to a broadcasting storage system of the plurality of storage systems.

17. The system of claim 16, wherein one or more of the plurality of storage systems is further configured to restore the failed constituent aggregate utilizing a rebuilding procedure.

18. The system of claim 11, wherein a RAID implementation of the one or more RAID groups comprises a RAID-4 implementation.

19. The system of claim 11, wherein the logical operation is an exclusive OR (XOR) operation between the data stored at the selected constituent aggregate and the other data stored at the other constituent aggregates of the plurality of constituent aggregates.

20. A non-transitory computer-readable medium containing executable program instructions for execution by a processor, the non-transitory computer-readable medium comprising:
- program instructions that organize a plurality of constituent aggregates as striped aggregates, the constituent aggregates implemented across a plurality of nodes operatively connected as a cluster, wherein each constituent aggregate includes a plurality of storage devices organized into one or more Redundant Arrays of Independent Disk (RAID) groups, wherein each constituent aggregate includes a first equal number of regions, and wherein each constituent aggregate reserves 1/Nth of storage space capacity to store redundancy information from the other constituent aggregates where N is a number of the plurality of constituent aggregates;
- program instructions that assign, for a second number of regions across the plurality of constituent aggregates, only a single aggregate as a parity owner aggregate;
- program instructions that store data received from a client at a selected constituent aggregate of the plurality of constituent aggregates;
- program instructions that compute redundancy information for the data stored at the selected constituent aggregate based on a logical operation between the data stored at the selected constituent aggregate and other data stored at other constituent aggregates of the plurality of constituent aggregates; and
- program instructions that store the computed redundancy information for the data stored at the selected constituent aggregate at one of the other constituent aggregates that is the assigned parity owner aggregate.

\* \* \* \* \*

UNITED STATES PATENT AND TRADEMARK OFFICE
CERTIFICATE OF CORRECTION

PATENT NO. : 8,495,417 B2
APPLICATION NO. : 12/351476
DATED : July 23, 2013
INVENTOR(S) : Richard P. Jernigan, IV et al.

Page 1 of 1

It is certified that error appears in the above-identified patent and that said Letters Patent is hereby corrected as shown below:

In the Specification

In col. 4, line 48:
delete "An exemplary"

Signed and Sealed this
First Day of October, 2013

Teresa Stanek Rea
*Deputy Director of the United States Patent and Trademark Office*